(12) United States Patent
Domingos et al.

(10) Patent No.: US 12,152,548 B2
(45) Date of Patent: Nov. 26, 2024

(54) VEHICLE MONITORING SYSTEM

(71) Applicant: Transportation IP Holdings, LLC, Norwalk, CT (US)

(72) Inventors: Cesar Domingos, Contagem (BR); Shawn Gallagher, Erie, PA (US); Raghav Shrikant Kulkarni, Bangalore (IN); Vinaykanth V Mudiam, Melbourne, FL (US); Neil Xavier Blythe, Erie, PA (US); Daniel Loringer, Erie, PA (US); Pedro Lopes, Contagem (BR); Vinayak Tilak, Hyderabad (IN); James Robert Mischler, Lawrence Park, PA (US); Patricia Sue Lacy, Lawrence Park, PA (US); Michael Majewski, Lawrence Park, PA (US); Pradheepram Ottikkutti, Lawrence Park, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 469 days.

(21) Appl. No.: 17/506,863

(22) Filed: Oct. 21, 2021

(65) Prior Publication Data
US 2022/0042472 A1 Feb. 10, 2022

Related U.S. Application Data

(63) Continuation-in-part of application No. 16/532,600, filed on Aug. 6, 2019, now Pat. No. 11,155,288,
(Continued)

(51) Int. Cl.
*F02D 41/04* (2006.01)
*B60W 50/00* (2006.01)
(Continued)

(52) U.S. Cl.
CPC ....... *F02D 41/042* (2013.01); *B60W 50/0225* (2013.01); *B60W 50/035* (2013.01);
(Continued)

(58) Field of Classification Search
CPC . B60W 2510/0604; B60W 2510/0638; B60W 2510/0676; B61L 15/0081;
(Continued)

(56) References Cited

U.S. PATENT DOCUMENTS 9,286,735 B1 * 3/2016 Ahn ...................... G07C 5/0808
10,493,837 B1 * 12/2019 Angelo .................... B60K 6/46
(Continued)

FOREIGN PATENT DOCUMENTS

WO WO-2016149064 A1 * 9/2016 .............. B61K 9/08

*Primary Examiner* — Tyler J Lee
(74) *Attorney, Agent, or Firm* — K&L Gates LLP

(57) ABSTRACT

A system detects a parameter and generates a first trip plan to automatically control the vehicle according to a first trip plan. A controller is connected to a sensor and configured to receive the parameter. The controller is configured to generate a new trip plan or modify the first trip plan into a modified trip plan based on at least one of a cumulative damage or an end of life date. A new trip plan or the modified trip plan is configured, during operation of the
(Continued)

vehicle according to the new trip plan or the modified trip plan, for at least one of an adjustment in velocity or avoiding one or more operating conditions of the vehicle, relative to the first trip plan.

20 Claims, 8 Drawing Sheets

Related U.S. Application Data which is a continuation-in-part of application No. 16/373,295, filed on Apr. 2, 2019, now Pat. No. 11,084,511.

(51) Int. Cl.
- *B60W 50/02* (2012.01)
- *B60W 50/035* (2012.01)
- *F01M 11/10* (2006.01)
- *G06Q 10/20* (2023.01)

(52) U.S. Cl.
CPC .......... *F01M 11/10* (2013.01); *G06Q 10/20* (2013.01); *B60W 2510/0604* (2013.01); *B60W 2510/0638* (2013.01); *B60W 2510/0676* (2013.01); *F01M 2250/64* (2013.01)

(58) Field of Classification Search
CPC .......... B61L 27/12; B61L 27/57; F01M 1/10; F01M 11/10; F01M 2250/64; F02D 41/042; F02D 41/22; G06Q 10/20
See application file for complete search history.

(56) References Cited

U.S. PATENT DOCUMENTS

| | | | |
|---|---|---|---|
| 10,689,004 B1 * | 6/2020 | Kulkarni | B61L 15/0081 |
| 2016/0035155 A1 * | 2/2016 | Rice | F16H 61/12 |
| | | | 701/51 |
| 2016/0093116 A1 * | 3/2016 | Ahn | G07C 5/0808 |
| | | | 701/31.9 |
| 2016/0110933 A1 * | 4/2016 | Ahn | G07C 5/0808 |
| | | | 701/31.9 |
| 2020/0363795 A1 * | 11/2020 | Kapadia | G05B 19/4063 |

* cited by examiner

VEHICLE MONITORING SYSTEM

CROSS-REFERENCE TO RELATED APPLICATIONS

This application is a continuation-in-part of U.S. patent application Ser. No. 16/532,600 (filed 6 Aug. 2019), which is a continuation-in-part of U.S. patent application Ser. No. 16/373,295 (filed 2 Apr. 2019, now U.S. Pat. No. 11,084,511), which claims priority to International Patent Application PCT/US2018/030231 (filed 30 Apr. 2018), which claims priority to U.S. Provisional Application No. 62/491,765 (filed 28 Apr. 2017). The entire disclosures of these applications are incorporated herein by reference.

FIELD

Embodiments of the subject matter disclosed herein relate to detecting and/or predicting the degradation of a vehicle propulsion subsystem.

BACKGROUND

Various vehicle systems include a propulsion subsystem. The propulsion subsystem may include engines, motors, pumps, turbochargers, oil filters, alternators, radiators, and/or other devices or machines that operate to propel the vehicle system. Operation of the propulsion subsystem over time can degrade components of the propulsion subsystem, which may lead to failure of the propulsion subsystem. The propulsion subsystem can be inspected to identify and/or repair damaged components based on a conventional or fixed maintenance schedule.

These types of maintenance schedules, however, can use conservative or fixed time schedules. The conservative time schedule can be based on a set of assumptions on the use and/or operation of the vehicle system to estimate when the components of the propulsion system may fail. Based on the set of assumptions, the conventional maintenance schedule may not be based on the usage and/or operation of the vehicle system and can incorrectly predict a shortened life cycle of the components of the propulsion subsystem. This conventional maintenance schedule may increase costs of inspections for components that are not at end of life and/or do not require replacement. Additionally, due to the frequent inspections, the vehicle systems may be taken out of service when inspections are not needed. This can decrease the efficiency at which a transportation network of vehicle systems operates. Additionally, during inspection of the components, contamination of components and/or damage to components may occur, thereby decreasing the efficiencies of the vehicle systems.

On the other hand, significant usage of the components and/or systems can result in the components degrading faster than expected. This can result in the components becoming irreparably damaged prior to the next scheduled inspection. It may be desirable to have systems and methods that differ than those that are currently available.

BRIEF DESCRIPTION

In an embodiment, a system (e.g., monitoring system) is provided. The system includes a sensor that may detect a parameter of a propulsion subsystem of a vehicle, and one or more controllers. At least one of the controllers may generate a first trip plan and to automatically control the vehicle according to the first trip plan. At least one of the controllers is operatively connected to the sensor and may receive the parameter of the propulsion subsystem. The one or more controllers may calculate a cumulative damage of a component of the propulsion subsystem based on the parameter, and to determine an end of life date of the component based on the cumulative damage. At least one of the controllers may generate a new trip plan or modify the first trip plan into a modified trip plan based on at least one of the cumulative damage or the end of life date that is determined. The trip plans (e.g., the first, new, and/or modified trip plans) dictate operational settings of the vehicle at different locations, distances along routes, or times. For example, the trip plans can dictate the throttle settings, speeds, braking efforts, or the like, that the vehicle system is to implement for travel along routes. In one embodiment, the trip plans can be created to reduce the fuel consumed and/or emissions generated by the vehicle system relative to the vehicle traveling according to other, different trip plans. The new or modified trip plan or the modified trip plan can adjust the velocity of the vehicle system (relative to the first trip plan) and/or avoid one or more operating conditions of the vehicle such that operation of the vehicle according to the new or modified trip plan results in less wear or use of the component when compared to operation of the vehicle according to the first trip plan.

In an embodiment, a method is provided. The method includes receiving, from one or more sensors, one or more parameters measured from a propulsion subsystem of a vehicle. The method includes calculating a cumulative damage of a component of the propulsion subsystem based on the parameter(s). The method includes generating a first trip plan and automatically controlling the vehicle according to the first trip plan. The method includes determining an end of life date of the component relative to (or based on) the cumulative damage. The method includes generating a new trip plan or modifying the first trip plan into a modified trip plan based on at least one of the cumulative damage or the end of life date. The new or modified trip plan or the modified trip plan can adjust the velocity of the vehicle system (relative to the first trip plan) and/or avoid one or more operating conditions of the vehicle such that operation of the vehicle according to the new or modified trip plan results in less wear or use of the component when compared to operation of the vehicle according to the first trip plan.

BRIEF DESCRIPTION OF THE DRAWINGS

The inventive subject matter may be understood from reading the following description of non-limiting embodiments, with reference to the attached drawings, in which.

DETAILED DESCRIPTION

Figure 1:
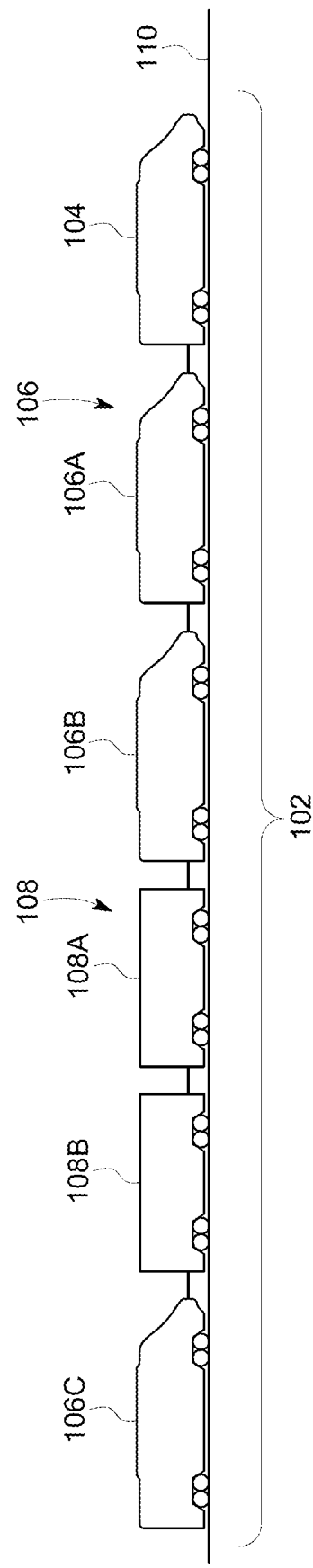
FIG. 1 illustrates a vehicle system, in accordance with an embodiment.

Various embodiments described herein relate to detecting degradation of a propulsion subsystem. The degradation may be detected by a monitoring system that may analyze a propulsion subsystem of a vehicle system. The vehicle system may include a single or plural propulsion-generating vehicles. Each of the propulsion-generating vehicles may include a propulsion subsystem. The propulsion subsystem may include components such as one or more engines, motors, alternators, generators, brakes, batteries, turbines, turbochargers, oil filters (e.g., centrifuge filters), and/or the like. Propulsion systems operate to propel the vehicle system. The vehicle system can include one or more vehicles. Suitable vehicles may include rail vehicles, automobiles, marine vessels, aircraft, mining vehicles, agricultural or industrial vehicles, or other off-highway vehicles (e.g., vehicles that are not designed for travel on public roadways and/or that are not legally permitted for travel on public roadways), and the like.

In one embodiment, the monitoring system may monitor one or more components of the propulsion subsystem, such as but not limited to, turbochargers, centrifugal oil filters, or the like. For example, the monitoring system may repeatedly receive parameters from a sensor that measures aspects of the operation of the turbocharger or oil filter. Based at least in part on the sensor parameters, the monitoring system determines the number and/or magnitude of high-stress events of the turbocharger, oil filter, motors, engines, brakes, or other component. For example, the high-stress events may be detected when a speed of the vehicle propulsion subsystem exceeds a designated, non-zero threshold. In another example, the high-stress events may be detected when a throttle setting of the vehicle propulsion subsystem exceeds a designated threshold, such as a throttle that is exceeding a mechanical specification of the vehicle propulsion subsystem (e.g., redlining the throttle settings of the vehicle propulsion subsystem). In another example, the high-stress events may be detected that indicate an operating temperature of the vehicle propulsion subsystem exceeds an upper threshold. Temperature excursions may indicate that a mechanical specification of the vehicle propulsion subsystem was exceeded. Excessive pressure may have been placed on bearings, or excessive speed of a rotating part, or a loss of lubricant, or over-energizing a motor. With regard to a battery system a high-stress event may be that the voltage supplied may be too high, or the current supplied to quickly, the current balance between strings or cells may be improper for the strings or cells (in an absolute sensor or relative to the then-current condition of aging strings or cells), or the internal resistance of the battery may have risen too high, or a cooling fan may be operating sub-optimally, or the ambient atmosphere may not allow for sufficient cooling.

The overstress or high-stress events may be identified by the monitoring system to determine cumulative usage of components of the turbocharger, oil filter, battery, motor, thermal management system, or the like. High-stress events may result in damage to the component, or a relatively lowered performance, and/or remaining useful life of that component. A distinction is made between ordinary wear and tear of a component and above average or extraordinary damage to a component. The monitoring system can generate, adjust or request an adjustment to a trip plan based on the cumulative damage of the component. During use, the monitoring system may examine the parameters received from the sensors to identify a throttle setting, temperature, operating speed, or the like, of the propulsion subsystem. The cumulative usage can be calculated based on these parameters and prior information of materials and processes used in the design and/or manufacture of the propulsion system and components of the propulsion system (e.g., the turbocharger, oil filter, etc.). In one embodiment, the monitoring system can generate a digital model or digital twin of the propulsion subsystem component based at least in part on the parameters and/or prior information. In another embodiment, the monitoring system may generate a trip plan that maps a route from the vehicle's current location to an appropriate service and maintenance shop (and notify interested parties of the need for service along with particular details of the requested service and scheduling information).

The digital twin can be an electronic representation of the current state of the component that is based on previous duty cycles and/or conditions in which the component operated. This digital twin can be examined by simulating future operation of the component at designated or planned operational settings and/or in designated or forecasted conditions. This simulation can reveal further usage (e.g., damage or other deterioration) of the component without actually subjecting the component to the future operation that is simulated. This can allow for effects of increased usage of the component to be predicted without actually increasing the usage of the component. For example, based on the digital twin, the monitoring system may predict when a component of the turbocharger or oil filter is likely to reach a state or condition were a likelihood of failure (health status), a likelihood of reaching an end of life date (e.g., during an upcoming planned or scheduled mission or trip), a likelihood of needing maintenance or servicing to avoid failure, or the like exceeds a designated, non-zero threshold. Based on this prediction, the monitoring system may automatically schedule repair and/or reserve time at an overhaul facility to maintain, service, or repair the component (e.g., prior to the failure of the component).

Optionally, the monitoring system may change or request that an operational plan of the component (or a system that includes the component) be modified based on the predicted usage. For example, a vehicle may be scheduled or expected to travel along one or more routes in an upcoming trip according to a trip plan. The trip plan may designate or dictate operational settings of the vehicle at different locations, distances along the route(s), and/or times during the upcoming trip. These operational settings can include throttle settings, brake settings, speeds, or the like. The monitoring system can change or request that the trip plan be modified responsive to examining cumulative or prior usage, simulating potential additional usage to the component due to operating according to the trip plan, and determining that the component has an increased likelihood of needing replacement, maintenance, or the like (e.g., has a greater than 50% chance of failure) before completion of the trip, is likely to require servicing before completion of the trip, and/or will have a remaining service or useful life that will decrease below a threshold.

During or responsive to detection of an overstress event, the monitoring system may mitigate or reduce further damage to the component. For example, the monitoring system may adjust or request adjustment to the trip plan, such as adjusting a throttle, an arrival time, brake setting, and/or the like. The monitoring system may adjust the trip plan to extend the end of life date or improve the health status of the component until an end of the trip plan. For example, the monitoring system may modify and/or form a new trip plan by reducing the throttle, breaking, schedule of the trip plan. Alternatively, the monitoring system can request that an energy management system modify and/or form a new plan. Optionally, the monitoring system automatically identifies the end of life date of the component and initiates maintenance or servicing of the component at time that is earlier than a next scheduled maintenance or repair.

Based at least in part on the parameters output by the sensor, the monitoring system may predict a remaining life of the component and/or operation of the component (e.g., the turbocharger or oil filter). The monitoring system may manage operation of the component based on the remaining life of the component to fully use up the life of the component prior to maintenance and/or schedule overhaul of the vehicle, or to delay when servicing, repair, or maintenance of the components would otherwise be needed.

The monitoring system may automatically adjust or request adjustment to a schedule and/or a moving velocity of the vehicle system to extend a life of the component during operation of the vehicle system. For example, during operation of the vehicle system, the monitoring system may determine that the end of life date of the component is likely to occur. The monitoring system may automatically schedule the maintenance and/or a servicing of the component, responsive to predicting that the component is likely to reach the end of life date. Optionally, the monitoring system may adjust or request adjustment to a throttle, breaking, schedule, and/or the like, of a trip plan based on a prediction that the component is likely to reach the end of life date.

The monitoring system may change distribution of a load across different propulsion-generating vehicles within the vehicle system to reduce damage to a component or to prolong when servicing or replacement of the component is needed. For example, the monitoring system may change operational settings of one or more propulsion-generating vehicles in a vehicle system having multiple propulsion-generating vehicles to change a distribution of tractive efforts, duty cycles, or the like, of propulsion systems of the vehicles. This re-distribution of operational settings can change the operational loads on different vehicles and can slow down deterioration or damage to one or more components of at least one of the vehicles. This can delay when servicing or maintenance is needed, or can extend the useful life, of one or more components of the vehicles.

One or more embodiments of the monitoring system examine rotor speed information to detect degrading functions and/or a need to service a centrifuge lube oil filter of the propulsion-generating vehicle. The degrading functions may represent buildup on the oil filter, such as soot cake, mass, degradation of oil passing through the oil filter, particles within the oil filter, and/or the like. The centrifuge lube oil filters are installed in engines to clean the lubrication oil. A rotor speed signal may be obtained from an engine control system and/or a speed sensor and, together with other collected information (e.g., lube oil pressure, lube oil temperature, engine speed), the monitoring system can assess the need for service and/or inspection from a particular centrifuge filter operating in the propulsion-generating vehicle. The monitoring system may display indicators to notify the operator to change the oil filter, replace the oil filter, perform maintenance on the oil filter, and/or the like. For example, the display may present diagnostic messages/codes to alert an operator of a corrective action (e.g., a need to service the oil filter). One or more controllers of the vehicle system may restrict engine operation in response to detection of a critical issue (e.g., the oil filter stops filtering or lubricant fails to flow through; or, a thermal management system has a thermal transfer capability that is lower than a determined threshold value).

Regarding the example using an oil filter, the monitoring system may shut down or derate the propulsion subsystem to reduce oil pressure on the oil filter and/or to reduce the thermal generation of parts receiving sub-optimal lubrication. The shutdown (or deration) of the propulsion subsystem may stop a rotor speed of the propulsion subsystem. The monitoring system can measure the rotor speed signal and record an amount of time elapsed from shut down until the speed of the rotor speed is reduced. This amount of time can indicate the health of the oil filter. For example, shorter times for the rotor speed to reduce to a designated speed (or become stationary) can indicate a clogged filter that needs to be replaced, while longer times can indicate that the filter has less clogging. The monitoring system may resolve problems such as determining when an oil filter is full of debris (e.g., soot cake). The monitoring system may advise the operator of the vehicle system of the oil filter, such as for of debris (e.g., soot cake). The rotor speed information may indicate operational capture issues with the rotor speed that may require corrective actions. For example, if the rotor is not rotating or is rotating more slowly, this lack of speed or reduced speed can indicate that the oil filter is clogged or is otherwise compromised).

One or more embodiments of the monitoring system may detect malfunctions in the centrifuge oil filter without having to open the filter for inspection, without having to open a housing in which the filter is disposed for inspection, and/or without stopping operation of the propulsion system that includes the oil filter. The monitoring system can detect when the filter needs servicing based on the monitored rotor speed, which is impacted by the amount of debris accumulated in the cylinder wall. For example, the monitoring system can calculate different profiles of rotor speeds that represent a temporal delay from shut down or deactivation of the propulsion system and the reduction of the rotor speed to a designated speed (e.g., zero speed or another speed). These profiles can represent how long is required for a rotor of a centrifugal oil filter to slow down to the designated speed after shut down of the engine. The monitoring system may compare the profiles to identify the status of the oil filter. For example, a first profile may have the rotor speed of an oil filter decreasing by a designated amount or percentage after shut down of the engine more rapidly than a second profile and a third profile, and the second profile may have the rotor speed decreasing by the designated amount more slowly than the first profile but faster than the third profile. Each of these profiles can be a model of the oil filter and can be associated with different amounts of usage. For example, the first profile can be associated with the least amount of filter usage (e.g., the least amount of buildup or clogging in the filter), the second profile can be associated with a greater amount of filter usage (e.g., a greater amount of buildup or clogging in the filter), and the third profile can be associated with an even greater amount of filter usage (e.g., an even greater amount of buildup or clogging in the filter).

The operator and/or the maintainer can be advised by the monitoring system via a display that presents information such as diagnostic messages, codes, or the like. This information can be presented to alert the operator and/or maintainer of a required corrective action. The monitoring system may restrict the operation of the engine in the event that a designated state or condition of the component is detected. For example, responsive to detecting the second and/or third profiles of the oil filter, the monitoring system may automatically adjust the trip plan. In another example, responsive to detecting the second and/or third profiles, the monitoring system may automatically schedule the inspection, maintenance, or replacement of the oil filter.

At least one technical effect of embodiments described herein includes real-time tracking of the remaining useful life or service life of components of a propulsion subsystem by identifying a cumulative usage model. At least one other technical effect includes the ability to track the cumulative usage and remaining useful life of individual components of the propulsion subsystem. At least one other technical effect includes the ability to schedule the replacement of components within the propulsion subsystem when the components approach the end of useful lives of the components. At least one other technical effect includes a reduction in unplanned maintenance, lost revenue, or disruption of service associated with the unexpected failure of a component. At least one other technical effect includes the ability to replace components during service and/or overhaul events which have achieved full useful life. At least one other technical effect includes the ability to match components with similar remaining useful life during a maintenance or overhaul event to minimize or reduce the number of service events required. At least one other technical effect includes a lower life-cycle cost by extending the useful life of components of the propulsion subsystem. At least one other technical effect includes avoiding unwarranted service interruptions of propulsion subsystems in the field. At least one other technical effect includes improved reliability of a propulsion subsystem. At least one other technical effect includes reduced risk to operating personnel of the vehicle system. At least one other technical effect includes a reduction of fuel consumption and improves the operations of the vehicle system through fuel savings and proper handling. At least one other technical effect includes increasing the cooling and lubrication system of the propulsion subsystem by optimizing the maintenance of the oil filter. At least one other technical effect includes identifying when the oil filter needs to be cleaned without needing to open the filter.

A more particular description of the inventive subject matter briefly described above will be rendered by reference to specific embodiments thereof that are illustrated in the appended drawings. The inventive subject matter will be described and explained with the understanding that these drawings depict embodiments of the inventive subject matter and are not, therefore, limiting of its scope. Wherever possible, the same reference numerals used throughout the drawings refer to the same or like parts. The various embodiments are not limited to the arrangements and instrumentality shown in the drawings.

FIG. 1 illustrates one embodiment of a vehicle system 102. The illustrated vehicle system includes one or more propulsion-generating vehicles 104, 106 (e.g., vehicles 104, 106A, 106B, 106C) and/or one or more non-propulsion-generating vehicles 108 (e.g., vehicles 108A, 108B) that travel together along a route 110. Although the vehicles are shown as being mechanically coupled with each other, in other embodiments the vehicles may not be mechanically coupled with each other. For example, the vehicles may be logically coupled by the vehicles communicating with each other to coordinate vehicle movements with each other so that the vehicles travel together along the route without being mechanically coupled to each other. The vehicle system can be formed from a single vehicle or multiple vehicles.

In FIG. 1, the propulsion-generating vehicles are locomotives, the non-propulsion-generating vehicles are shown as rail cars, and the vehicle system is shown as a train in the illustrated embodiment. In other embodiments, the vehicle system may represent other vehicles. In the context of rail vehicles, groups of one or more adjacent or neighboring propulsion-generating vehicles may be referred to as a vehicle consist. For example, the vehicles 104, 106A, 106B may be referred to as a first vehicle consists of the vehicle system and the vehicle 106C referred to as a second vehicle consists of the vehicle system. In one embodiment, the vehicle consists may be defined as the vehicles that are adjacent or neighboring to each other, such as a vehicle consist defined by the vehicles 104, 106A, 106B, 108A, 108B, 106C.

Figure 2:
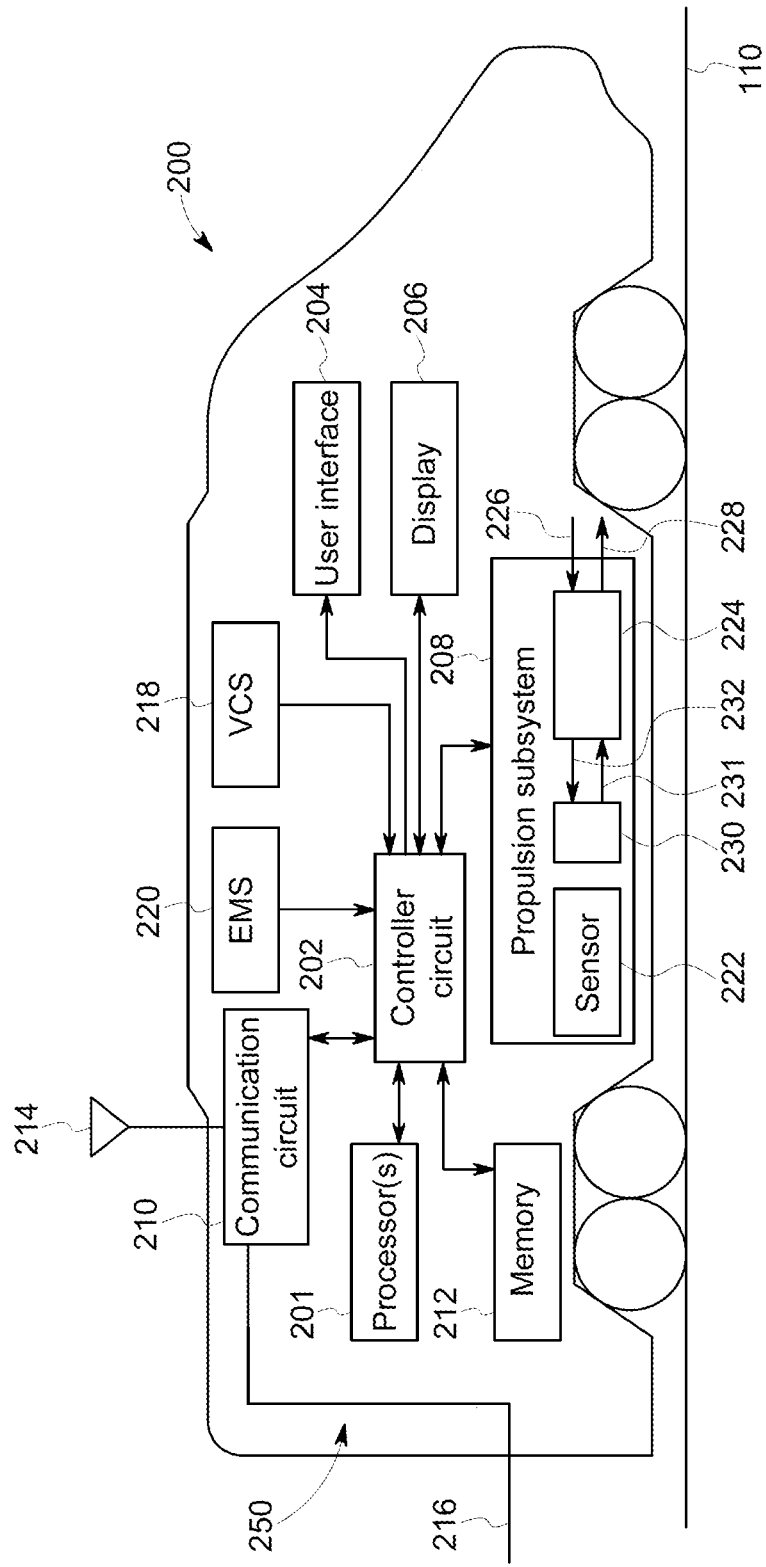
FIG. 2 is a schematic diagram of a monitoring system within a propulsion-generating vehicle, in accordance with an embodiment.

FIG. 2 is a schematic diagram of a propulsion-generating vehicle 200 in accordance with one embodiment. The vehicle in FIG. 2 may represent one or more of the vehicles shown in FIG. 1. The vehicle may include a monitoring system 250 that monitors operation of components of the vehicle. A controller circuit 202 controls operations of the vehicle. The monitoring system and/or controller circuit may include or represent one or more hardware circuits or circuitry that include, are connected with, or that both include and are connected with one or more processors 201, one or more controllers, or other hardware logic-based devices.

The controller circuit may be connected with a communication circuit 210. The communication circuit may include hardware and/or software that may communicate with other vehicles within the vehicle system, dispatch stations, remote system, maintenance systems, and/or the like. For example, the communication circuit may include a transceiver and/or associated circuitry (e.g., an antenna 214) for wirelessly communicating (e.g., communicating and/or receiving) linking messages, command messages, linking confirmation messages, reply messages, retry messages, repeat messages, status messages, and/or the like. In one embodiment, the communication circuit may include circuitry for communicating the messages over a wired connection 216, such as a multiple unit (MU) line of the vehicle system, catenary or third rail of an electrically powered vehicle, or another conductive pathway between or among the propulsion-generating vehicles in the vehicle system.

The controller circuit is connected to a user interface 204 and the display 206. The controller circuit can receive manual input from an operator of the propulsion-generating vehicle through the user interface, such as a keyboard, touchscreen, electronic mouse, microphone, and/or the like. For example, the controller circuit can receive manually input changes to the tractive effort (e.g., notch settings), braking effort, speed, power output, and/or the like, from the user interface. The term "notch settings" refers interchangeably to a throttle setting of the propulsion-generating vehicle.

A memory 212 may be used for storing data (e.g., one or more parameters) associated with one or more sensors 222 (e.g., operational threshold values, location information), component specification information, firmware or software corresponding to, for example, programmed instructions for one or more components in the propulsion-generating vehicle (e.g., the controller circuit, a propulsion subsystem 208, an energy management system, a vehicle control subsystem 218, and/or the like). For example, the memory may store parameters acquired from the one or more sensor, such as the rotor speed information received from the propulsion subsystem. The memory may be a tangible and non-transitory computer readable medium such as flash memory, RAM, ROM, EEPROM, and/or the like.

A display 206 may include one or more liquid crystal displays (e.g., a light emitting diode (LED) backlight), organic light emitting diode (OLED) displays, plasma displays, CRT displays, and/or the like. For example, the controller circuit can present the status and/or details of the vehicle system, faults/alarms generated by the controller circuit (e.g., diagnostic messages/codes), identities and statuses of the remote vehicle systems traversing along the route, contents of one or more command messages, and/or the like. Optionally, the display may be a touchscreen display, which may include at least a portion of the user interface.

A vehicle control system (VCS) 218 can include hardware circuits or circuitry that include and/or are connected with one or more processors to the controller circuit. The VCS may control and/or limit movement of the propulsion-generating vehicle and/or the vehicle system that may include the vehicle based on one or more limitations. For example, the VCS may prevent the vehicle and/or vehicle system from entering into a restricted area, can prevent the vehicle and/or vehicle system from exiting a designated area, can prevent the vehicle and/or vehicle system from traveling at a speed that exceeds an upper speed limit, can prevent the vehicle and/or vehicle system from traveling at a speed that is less than a lower speed limit, and/or the like. In one embodiment, the VCS may include and/or represents a positive train control system. A suitable positive train control system may be the I-ETMS PTC system that is commercially available from Wabtec Corporation. The VCS may be programmed and/or otherwise, have access to the vehicle identifiers of the vehicles included in the vehicle system stored in the memory. For example, the VCS may store right access to the vehicle identifiers so that the VCS can determine how to control or limit control of the vehicle and/or the vehicle system that may include the vehicle to prevent the vehicle and/or vehicle system from violating one or more of the limits.

An energy management system 220 can include hardware circuits or circuitry that include and/or are connected with one or more processors to the controller circuit. The energy management system can create and/or update the trip plans described herein. The controller circuit receives the parameters from the sensor during the trip plan. Based on the parameters received from the sensor, the controller circuit may instruct the energy management system to revise and/or modify the trip plan.

The energy management system may generate trip plans for the vehicle and/or the vehicle system. For example, the trip plan may represent a notch setting (e.g., a throttle), braking, a schedule, and/or the like of the vehicle system to arrive at an end location. The trip plan may designate operational settings (e.g., notch settings and/or throttle) of the vehicle and/or the vehicle system as a function of time, location and/or distance along a route for a trip plan. Traveling according to the operational settings designated by the trip plan can reduce fuel consumed and/or emissions generated by the vehicle and/or the vehicle system relative to the vehicle and/or vehicle system traveling according to other operational settings that are not designated by the trip plan. The energy management system may be programmed with or otherwise have access to the vehicle identifiers of the vehicles included in the vehicle system. The identities of the vehicles in the vehicle system may be known to the energy management system so that the energy management system can determine what operational settings to designate for the trip plan to achieve a goal of reducing fuel consumed and/or emissions generated by the consists during the trip plan.

The controller circuit is operably and/or conductively coupled to a propulsion subsystem. The propulsion subsystem may provide tractive effort and/or braking effort for the propulsion-generating vehicle. The controller circuit can generate control signals autonomously (e.g., from the energy management system) and/or based on manual input that is used to direct operations of the propulsion subsystem. The propulsion subsystem may include or represent one or more engines 230, motors, alternators, generators, turbochargers, brakes, batteries, turbines, oil filters, and/or the like, (for simplicity, these are not shown). These components may operate to propel the propulsion-generating vehicle. This operation may be done under the manual or autonomous control that is implemented by the controller circuit depending on the features and specification of particular embodiments.

The energy management system may adjust the trip plan by adjusting the braking and/or throttle of the vehicle system. For example, one or more sensor may measure parameters used by the control system to identify or quantify cumulative usage of the propulsion subsystem. Based on the cumulative usage of the propulsion subsystem, the controller circuit may adjust the notch settings (e.g., throttle) and/or schedule of the trip plan to reduce or limit the additional usage or deterioration of the component. The controller circuit may adjust an arrival time, fuel usage, and/or a component repair cost based on the adjustment of the throttle and/or braking. The controller circuit may adjust the throttle, braking, arriving schedule, and/or the like to reduce usage or deterioration of the component. In one embodiment, the controller circuit may reduce the braking of the propulsion-generating vehicle. For example, the controller circuit reduces an amount of braking of a portion-generating vehicle during a steep grade, a curve, and/or the like along the route 110.

The propulsion subsystem is shown having a turbocharger 224. The turbocharger may couple to an exhaust passage 228 and an intake passage 226. For example, the intake passage receives ambient air from outside the vehicle and is received by the engine via an intake passage 232 interposed between the turbocharger and the engine. Exhaust gas resulting from combustion in the engine is supplied to the exhaust passage 231 and is expelled along the exhaust passage by the turbocharger. The turbocharger may increase air charge of ambient air drawn into the intake passage to provide greater charge density during combustion to increase power output and/or engine-operating efficiency of the engine.

Figure 3:
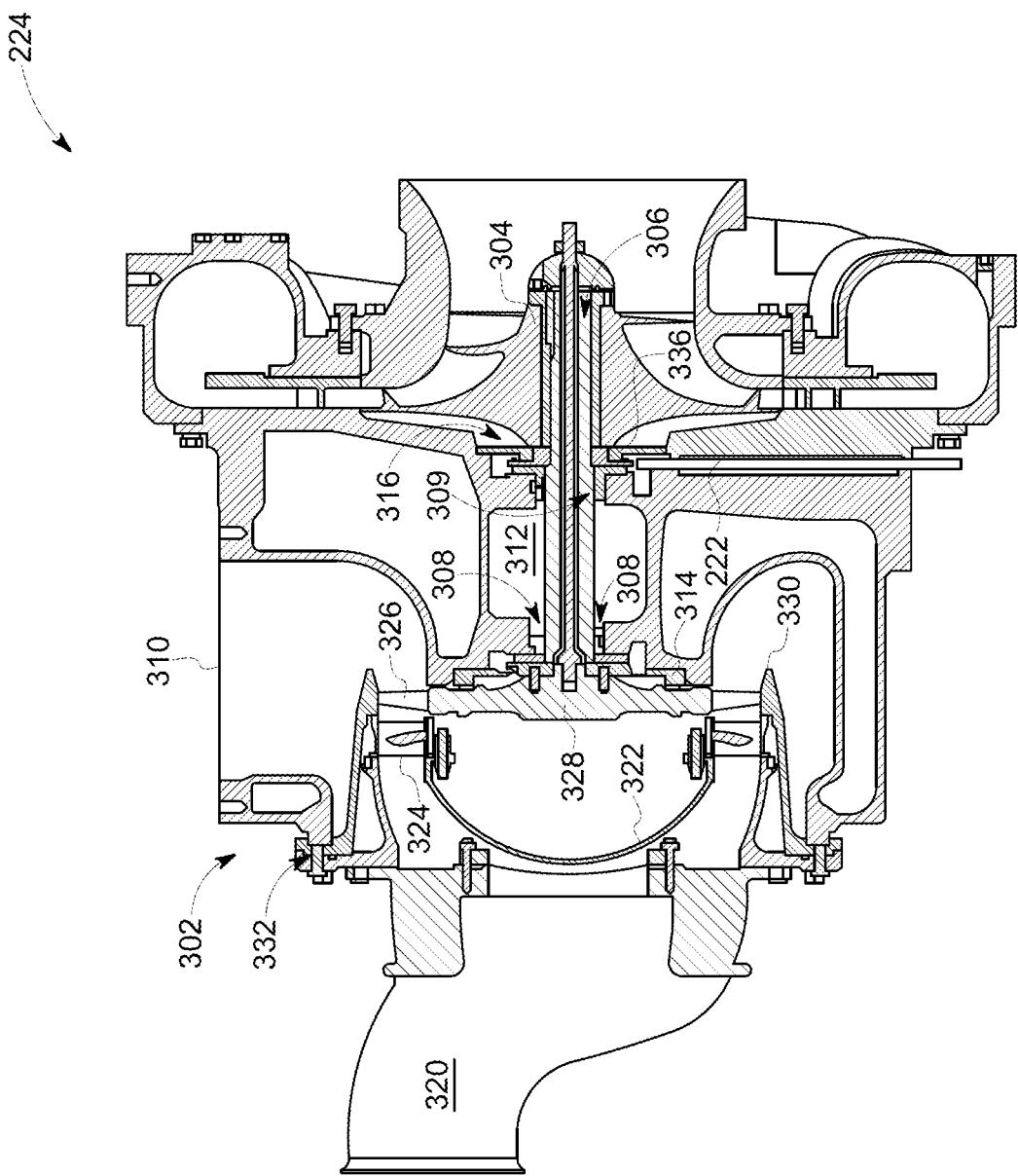
FIG. 3 is an illustration of an embodiment of a turbocharger.

FIG. 3 is an illustration of an embodiment of the turbocharger. The turbocharger may be mechanically and functionally coupled to the engine of the propulsion subsystem. In another example, the turbocharger may be coupled between the exhaust passage and the intake passage of the engine. In another example, the turbocharger may be coupled to the engine by any other suitable manner.

The turbocharger may include a turbine stage 302 and a compressor 304. Exhaust gases from the engine pass through the turbine stage, and energy from the exhaust gases is converted into rotational kinetic energy to rotate a shaft 306 which, in turn, drives the compressor. Ambient intake air is compressed (e.g., the pressure of the air is increased) is drawn through the rotating compressor such that a greater mass of air may be delivered to the cylinders of the engine.

A suitable turbocharger may include a casing 310. In other embodiments, the turbine stage and the compressor may have separate casings which are bolted together, for example, such that a single unit (e.g., turbocharger) is formed. As an example, the turbocharger may have a casing made of cast iron, and the compressor may have a casing made of an aluminum alloy, gray iron, and/or the like.

The turbocharger may include a turbine bearing 308 and a compressor bearing 309 to support the shaft, such that the shaft may rotate at high speed with reduced friction. The turbocharger may include two non-contact seals (e.g., labyrinth seals), a turbine labyrinth seal 314 positioned between an oil cavity 312 and the turbine disc 328 and a compressor seal 316 positioned between the oil cavity and the compressor. The oil cavity may include one or more oil filters 311 positioned proximate to the oil cavity.

Exhaust gas may enter through an inlet, such as gas inlet transition region 320, and pass over a nosepiece 322. A nozzle ring 324 may include airfoil-shaped vanes arranged circumferentially to form a complete 360° assembly. The nozzle ring 324 may act to optimally direct the exhaust gas to a turbine disc/blade assembly, including blades 326 and a turbine disc 328, coupled to the shaft 306. Additionally or alternatively, the turbine disc 328 and blades 326 may be an integral component, known as a turbine blisk. The rotating assembly of the turbine, including the turbine disc 328, blades 326, and shaft 306, may collectively be referred to as the turbine rotor.

In one embodiment, the blades are airfoil-shaped blades and extend outwardly from the turbine disc. The disc may rotate about the centerline axis of the turbocharger. An annular shroud 330 may be coupled to the casing at a shroud mounting flange 332 and arranged to closely surround the blades and thereby define the flow path boundary for the exhaust stream flowing through the turbine stage.

Returning to the description of FIG. 2, the propulsion subsystem may include one or more sensors. The one or more sensor may measure one or more parameters of the propulsion subsystem. For example, the one or more sensor may include magnetic sensors (e.g., Hall Effect sensors), speed sensors, pressure sensors, ultrasonic sensors, temperature sensors, vibration sensors, distance sensors, and/or the like. The one or more sensor may detect a rotor speed and/or the blades 326 of the propulsion subsystem. The one or more parameters may represent characteristic data (e.g., notch settings, throttle, speed data, temperature data, pressure data, oscillation, and/or the like) of the propulsion subsystem of the vehicle. Optionally, as shown in FIG. 2, the one or more sensor may be a part of the propulsion subsystem. For example, at least one sensor may be utilized to measure the speed of the rotor of the engine.

In another example, in connection with FIG. 3, at least one of the sensor may be positioned within the turbocharger. The sensor may determine a speed of the turbine rotor based on the interaction between the sensor and a notched or toothed wheel of the turbocharger. For example, the sensor are positioned adjacent to turbine thrust collar 336. The turbine thrust collar may be annular shaped and substantially surround a portion of shaft 306. As such, the thrust collar may rotate with the shaft. The thrust collar may include a plurality of notches that, when in alignment with a central axis of the sensor, cause an increase in the voltage output by the sensor. Based on the frequency of the voltage output, the speed of the turbocharger may be determined.

Each of the one or more sensor may generate a sensor measurement signal, which may be received and/or acquired by the controller circuit. The sensor measurement signals include one or more electrical characteristics representing the parameters acquired by the one or more sensor. Based on the one or more electrical characteristics of the sensor measurement signal (e.g., amplitude, voltage, current, frequency, binary sequence, and/or the like), the controller circuit may determine parameters of the propulsion subsystem.

Figure 4:
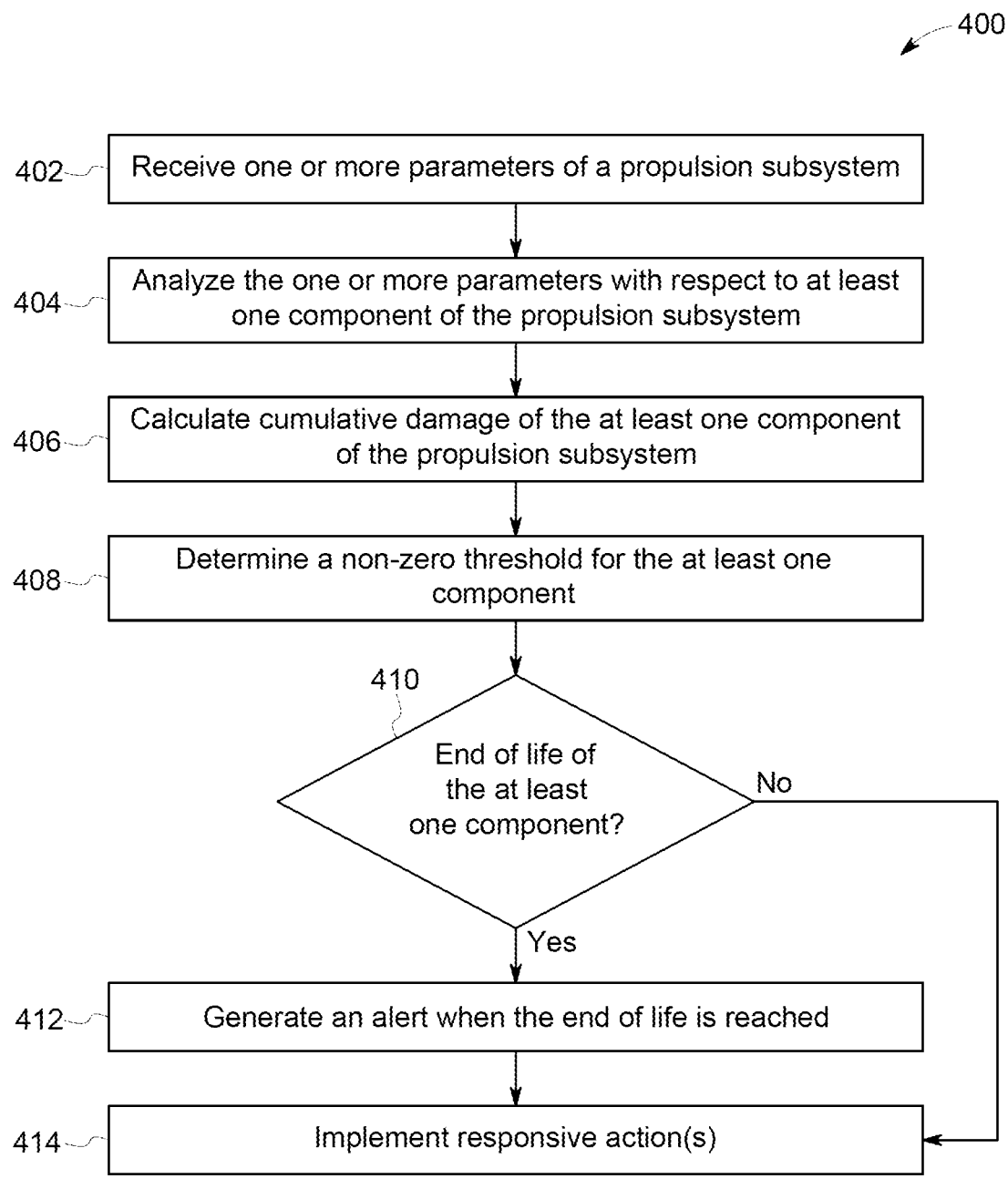
FIG. 4 is a flowchart of an embodiment of a method for detecting degradation of a propulsion subsystem.

FIG. 4 is a flowchart of an embodiment of a method 400 for detecting degradation of a propulsion subsystem. The method may be performed by structures or aspects of various embodiments of the monitoring system described herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method may use one or more algorithms to direct hardware to perform one or more operations described herein.

The method may be performed by a remote system off-line and/or remote from the vehicle system and/or the vehicle. For example, the one or more parameters may be transmitted to the remote system (e.g., a dispatch stations, remote system, maintenance systems, and/or the like) along with uni- and/or bi-directional communication link established by the communication circuit. The remote system may include a controller circuit similar to and/or the same as the controller circuit to perform the operations described in the method.

At step 402, the monitoring system may receive one or more parameters of the propulsion subsystem. For example, the controller circuit can be operably connected to the sensor and receive the parameters of the propulsion subsystem. The controller circuit may calculate cumulative usage of the component of the propulsion subsystem based on the parameters and determine the health status and/or the end of life date of the component relative to the cumulative usage. The one or more parameters may represent a characteristic of the operation of the propulsion subsystem over a period of time. The one or more parameters may represent characteristic data (e.g., notch settings, speed data, temperature data, pressure data, oscillation, and/or the like) of the propulsion subsystem of the vehicle. For example, at least one of the parameters may represent a speed of the rotor speed of the engine of the propulsion subsystem, a speed of the blades 326 and/or rotational speed of the shaft 306 of the turbocharger, a speed of a rotor in a centrifugal oil filter, or the like.

The one or more parameters may represent a sensor measurement signal generated by the one or more sensor. The measurement signal may include electrical characteristics that represent the one or more parameters. The electrical characteristics may be an amplitude, voltage, current, frequency, binary sequence, and/or the like. Based on the electrical characteristics of the sensor measurement signal, the controller circuit may determine the one or more parameters.

The cumulative usage can be calculated from the parameters based on previously measured amounts of usage of the same or other components. For example, different amounts of usage to other filters, rotors, cylinders, or the like, can be associated with different numbers of duty cycles in which other turbochargers operated, with different throttle settings by which other turbochargers operated, with different speeds at which vehicles having other turbochargers moved, with different exhaust gas temperatures coming from other turbochargers. The monitoring system can compare the measured parameters of a currently examined turbocharger with these previously measured parameters to estimate or approximate the usage to the currently examined turbocharger. The monitoring system can assume that a first turbocharger is damaged, deteriorated, or has a reduced remaining service life as much as a second turbocharger based on the first and second turbochargers having the same sensor parameters, where the remaining service life of the second turbocharger previously was measured.

Additionally or alternatively, the monitoring system can project and/or forecast the cumulative damage based on a trip plan generated by the energy management system. The energy management system may generate a new trip plan and/or modify the trip plan into a modified trip plan based on a least one of the cumulative usage, the health status, or the end of life date. The monitoring system receives parameters from the sensor that may indicate usage of the components thus far. The monitoring system can examine the operational settings dictated by the trip plan and project additional usage of the components. For example, the monitoring system can predict that an oil filter will become significantly more clogged when the trip plan dictates that the propulsion system operate at higher throttle settings than when the trip plan dictates smaller throttle settings. The projected damage can be based on previous trips by the same or other vehicle systems, where the operational settings dictated by a trip plan are the same as (or similar to, such as within 10%) the operational settings used by a vehicle system in a previous trip. The additional usage of a component from a previous trip can be expected to occur to a component for an upcoming trip based on the previous operational settings of the vehicle during the previous trip being the same as or similar to the operational settings dictated by the trip plan for the upcoming trip. The monitoring system can use the previously measured additional damage or deterioration as a benchmark or estimate of the additional damage that is expected to occur for the upcoming trip.

The monitoring system can examine the additional usage that is expected to happen to the component in the upcoming trip based on the trip plan and determine whether to change the trip plan (or request a change to the trip plan). For example, if the additional expected or predicted damage due to operation according to the trip plan will exceed a designated threshold (e.g., a percentage of filter clogging, an exhaust gas temperature, etc.), then the monitoring system can request a new or different trip plan. As another example, if the monitoring system determines that the additional expected or predicted damage due to operation according to the trip plan will reduce the remaining service life of the component below a designated threshold (e.g., a time that will occur before conclusion of the trip), then the monitoring system can request a new or different trip plan.

The trip plan can be modified or a new trip plan can be created by the energy management system responsive to receiving a request (e.g., via a data signal) from the monitoring system. The energy management system can modify or create a trip plan by reducing the operational settings at one or more locations or times in the trip. For example, the modified or new trip plan can have lower throttle settings or speeds in locations having hotter ambient temperatures to reduce damage to the turbocharger. As another example, the modified or new trip plan can cause the vehicle to travel over another, different route to avoid travel through more polluted areas or through airflow constricted areas (e.g., in tunnels) to avoid further clogging of a filter. The trip plan that is modified or created may result in less wear or use of the component relative to the operation of the vehicle system according to the previous trip plan.

At step 404, the monitoring system may analyze the one or more parameters with respect to at least one component of the propulsion subsystem. For example, the at least one component may be a part of the one or more engines, motors, alternators, generators, turbochargers, brakes, oil filters, batteries, turbines, the rotor speed, and/or the like. For example, the at least one component may be the shaft, bearings, compressor, seal, turbine disc, blades, and/or the like, of the turbocharger. In another example, the at least one component may be the rotor, bearings, oil filters (e.g., centrifuge lube oil filters), and/or the like of the one or more engines of the propulsion subsystem.

Figure 6:
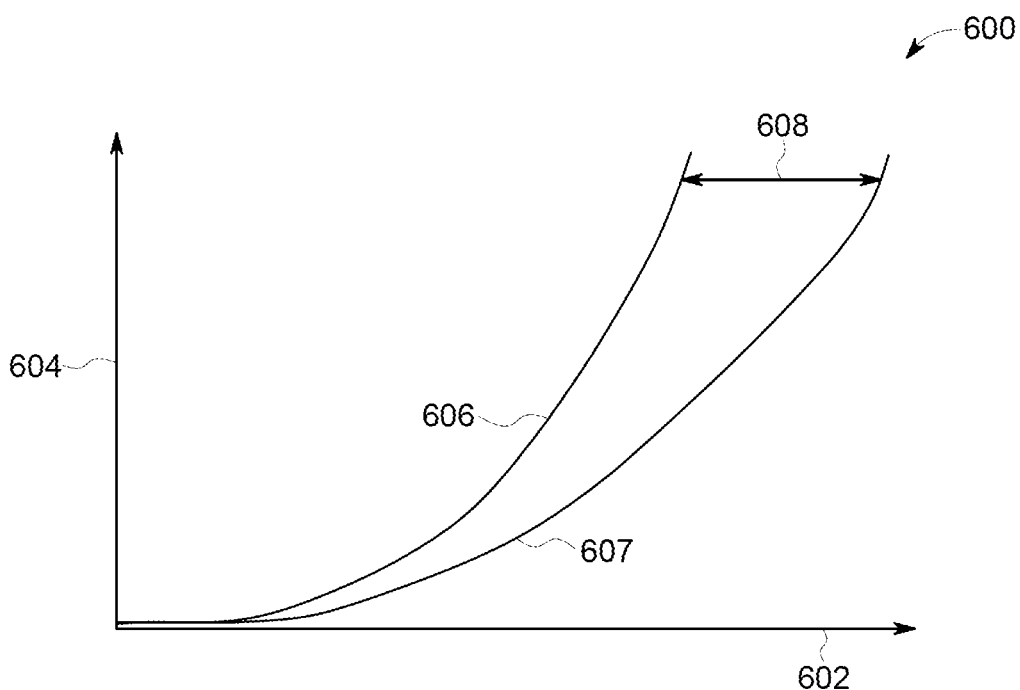
FIG. 6 is a graphical illustration of an embodiment of first and second parameters.

In one embodiment, the monitoring system may analyze the one or more parameters to determine a usage duty cycle of the propulsion subsystem based on the one or more parameters (e.g., the first and second parameters 606, 607 shown in FIG. 6). The usage duty cycle may indicate a level or magnitude of stress and/or fatigue exhibited on the at least one component of the propulsion subsystem. The usage duty cycle indicates an amount of use of the vehicle system during operation of the trip plan. Based on the usage duty cycle, the controller circuit may measure the cumulative usage of the at least one component of the vehicle system. For example, the controller circuit receives the parameters from the sensor and determines an amount of stress and/or fatigue exhibited on the at least one component based on the received parameters. The stress and/or fatigue may be calculated by the controller circuit based on a set of mechanical specifications of the at least one component stored in the memory. The mechanical specifications may include a plurality of fatigue and/or stress levels exerted on the at least one component with corresponding levels of the one or more parameters over a period of time. For example, one of the parameters may represent a rotational speed of the turbine rotor (e.g., may include the turbine disc, blades, and shaft) of the turbocharger, the rotor speed of a centrifugal oil filter, or the like. The controller circuit may identify an amount of fatigue and/or cumulative damage based on the rotational speed (e.g., the one or more parameters, throttle, notch settings) over the period of time for the one or more parameters in the mechanical specifications stored in the memory.

At step 406, the controller circuit may calculate the cumulative usage of the component of the propulsion subsystem. The cumulative usage of the component may be more or less than actual usage of the component. For example, the cumulative usage of a component may not be exactly the same as the amount of time that the component has been used. Instead, the cumulative usage can be greater for components that have experienced greater wear and tear than other components that have been used the same amount of time, but that have experienced lesser wear and tear.

The cumulative usage may represent a total amount of damage to the component during operation of the propulsion subsystem for the life of the at least one component. Cumulative damage may be caused by fatigue, stress, or material build-up (e.g., debris, soot cake, and/or the like) on the component. The cumulative damage may also be a combination of multiple service life events, some of which may have occurred from alternative propulsion subsystems of the at least one component. For example, the component may have experienced cumulative damage in another propulsion subsystem and/or vehicle, which was overhauled or repaired. The cumulative damage of the at least one component of the propulsion subsystems may be tracked, recorded, and/or accounted and stored in the memory, which can be used to calculate the cumulative damage. For example, the cumulative damage exerted on the component within the propulsion subsystem may be tracked, recorded, and/or accounted based on Equation 1 (below). The controller circuit may determine the cumulative usage of the component based on the one or more parameters utilizing a cumulative usage model stored in the memory based on Equation 1.

For example, the cumulative usage model may be based on Miner's rule as shown in Equation 1 below.

$$\sum_{i=1}^{k} \frac{n_i}{N_i} = C \qquad \text{Equation (1)}$$

The variable k represents a number of stress and/or fatigue levels exhibited on the at least one component. For example, the variable k may correspond to the level of fatigue and/or stress applied to the at least one component based on the cells 524 of the rainflow cycle count matrix 500 shown in FIG. 5 corresponding to a number of transitions between notch settings. The variable $n_i$ represents a number of cycles accumulated at the stress and/or fatigue level. The variable $N_i$ is the number of cycles to failure of at constant stress and/or fatigue level (e.g., at k). Optionally, the variable $N_i$ may be defined by the mechanical specifications stored in the memory. The variable C represents a fraction of operable life consumed during operation of the propulsion subsystem for the end of life date of the at least one component. For example, when the variable C is equal to 1, the component fails and/or has reached the end of life date. Additionally or alternatively, the variable C may not be 1 for the failure of the at least one component to occur. For example, the variable C may be more and/or less than one based on testing by the manufacturer and/or operational history of the component of the propulsion subsystem. For example, responsive to see being less than one, the component may be not reach the end of life date.

Based on Equation 1, the monitoring system may calculate a proportion of operable life consumed of the at least one component at each stress and/or fatigue level. The monitoring system may sum the one or more parameters together to determine the fraction of the remaining life of the at least one component corresponding to the cumulative usage. The monitoring system may store the cumulative usage of the component in the memory. In one embodiment, the monitoring system may adjust the digital model of the propulsion subsystem based on the cumulative usage. For example, the digital model may be modified to reflect the additional damage done to the component.

Optionally, the monitoring system may calculate a projected life of the at least one component. The projected life of the component may represent a fraction of the operable life not consumed during operation of the propulsion subsystem. The operable life of the component may be based on the one or more parameters measured by the one or more sensor. For example, the projected life may represent an amount of operable life prior to the end of life date of the component. The projected life of the component may be a difference of the variable C of Equation 1 (e.g., a change in the value of C).

In one or more embodiments, the monitoring system may generate a model of the propulsion subsystem based on the one or more parameters. For example, the controller circuit may generate a digital model of the turbocharger based on the one or more parameters. The digital model may be stored in the memory 212, and represent a status based on the one or more parameters acquired by the sensor. Based on the usage duty cycle, the controller circuit determines the cumulative damage from the level or magnitude of stress and/or fatigue exhibited on the at least one component. The model may be updated with additional resource data during additional usage duty cycles of the component.

Additionally or alternatively, the controller circuit may determine an amount of fatigue and/or stress exhibited on the at least one component utilizing a rainflow cycle count matrix 500. In connection with FIG. 5, the rainflow cycle count matrix 500 may represent changes in one or more parameters during a period of time. For example, the one or more parameters may represent different notch settings (e.g., throttle). The notch settings may correspond to speed and/or throttle selected by the user interface 204 and/or the energy management system executing the trip plan of the vehicle.

Figure 5:
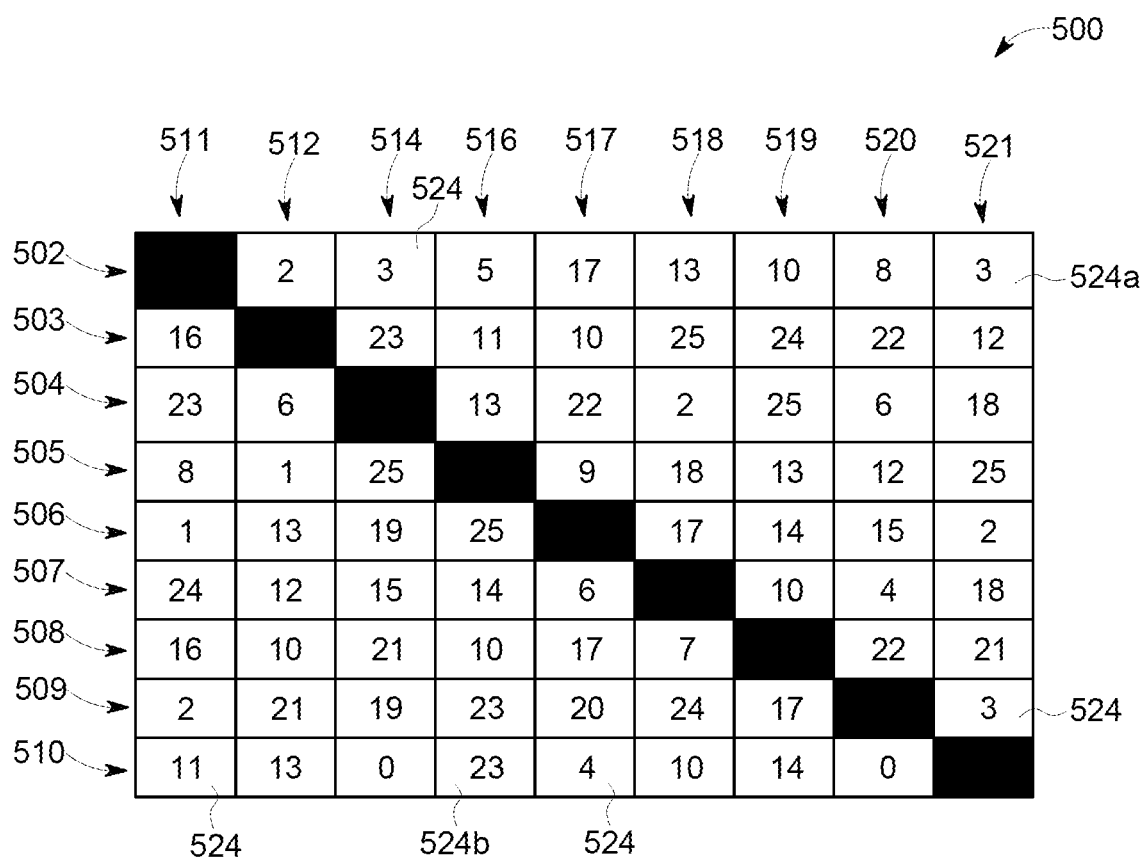
FIG. 5 is an embodiment of a rainflow cycle count matrix.

FIG. 5 is a depiction of a rainflow cycle count matrix 500. The matrix includes a set of rows 502-510 and columns 511-521. Each of the rows 502-510 and the columns 511-521 may represent different notch settings (e.g., throttle settings). For example, the vehicle may have nine or more different notch settings representing different speeds and/or throttle of the propulsion subsystem. The matrix may include a plurality of cells 524 each representing magnitude of changes in notch settings over a period of time. For example, each of the rows 502-510 may be a reference notch, and the columns 511-521 may represent the transition notch. The reference notch may represent an initial throttle and/or notch setting during the trip plan. The transition notch may represent a movement of the throttle and/or notch setting during the trip plan relative to the reference notch. For example, the reference notch may be positioned at a two throttle and/or notch setting, and the transition notch may adjust the throttle and/or notch setting to seventeen. An adjustment of the transition notch relative to the reference notch may indicate fatigue and/or stress exhibited on the component. For example, the controller circuit may receive the adjustment of the throttle and/or notch settings, which may indicate additional stress on the component. The matrix 500 illustrates changes from the reference notch to the transition notch. The period of time may correspond to an amount of time to complete the trip plan executed by the energy management system, a length of time (e.g., a week, a month, a year, and/or the like), and/or the like. The plurality of cells 524 may represent a number of transitions of the notch settings (e.g., from the rows 502-510 to the columns 511-521) over a period of time. For example, the cell 524a may represent three transitions from notch one, represented by the row 502, to notch nine, represented by the column 521. In another example, the cell 524b may represent twenty-three transitions from notch nine, represented by the row 510, to notch four, represented by the column 516.

Based on the transitions between the throttle settings, the controller circuit may determine a level of fatigue and/or stress exhibited on the at least one component over the period of time. For example, each transition of the notches may correspond to a different amount of fatigue and/or stress for the at least one component based on the different notch settings (e.g., throttle). The controller circuit may determine an amount of cumulative damage of the at least one component based on the set of mechanical specifications of the at least one component stored in the memory. For example, the controller circuit determines the cumulative damage based on the level of fatigue and/or stress exhibited relative to the set of mechanical specifications. Optionally, the controller circuit may add the different fatigue and/or stress values together to determine the health status and/or the end of life date of the at least one component.

FIG. 6 is a graphical illustration 600 of one example of first and second parameters 606, 607. The first parameter 606 is temporally different than the second parameter. For example, the first parameter may have been acquired during a different one of the trip plans relative to the second parameter. For example, the first and second parameters both may represent rotational speeds of a rotor that are measured during different trips of the vehicle, or during different segments of the same trip of the vehicle. Alternatively, the parameters can represent moving speeds of the vehicle during different trips of the vehicle, or during different segments of the same trip of the vehicle. The first and second parameters are shown along a horizontal axis 602 representing time and a vertical axis 604 representing speed. One or more of the parameters can be scaled so as to be shown alongside the same vertical axis 604. The parameters may be measured by the one or more sensor.

The monitoring system may compare morphologies (e.g., shapes) of the curves representing the first and second parameters. For example, the morphology may represent a slope, an amplitude, a number of peaks, shape, and/or the like of the parameters. The first and second parameters may be used by the monitoring system to determine the cumulative damage, performance, and/or the like, of the component, such as the oil filter. The changes in the morphology between the first and second parameters may be indicate the cumulative damage of the at least one component. For example, the component may be a lubricant and/or oil filter (e.g., centrifuge filter) of the engine of the propulsion subsystem. During operation of the propulsion subsystem, debris (e.g., soot cake) may disturb the flow of lubricant and/or oil traversing through the oil filter. The obstruction of the flow of the lubricant and/or oil affects the morphology of the first and second parameters (e.g., adjust the magnitude of the slope) and performance of the propulsion subsystem. The affected performance of the propulsion subsystem may be reflected in a change in the morphology of the one or more parameters measured by the one or more sensor.

As another example, the first and second parameters may represent the rotor speed of the centrifuge oil filter that is spinning at a given operating point. The operating point may be based on the rotor speed, throttle, notch setting, and/or the like. Responsive to the engine shutting down, the oil pressure through the oil filters may be reduced. The engine shut down may prevent oil from passing through the oil filter and thereby cause the rotor speed to halt or stop. The monitoring system may detect the rotor speed via the one or more sensor stored in the memory and record the amount of time elapsed until the first and second parameters stop. The changes of the first and second parameters may create a profile that can correlate the rotor speed behavior and may identify discrepancies and/or issues of the oil filters. For example, the differences of the oil filters may represent a clean filter, issues with the filter, soot cake, mass building on the oil filters, and/or the like.

Figure 10:
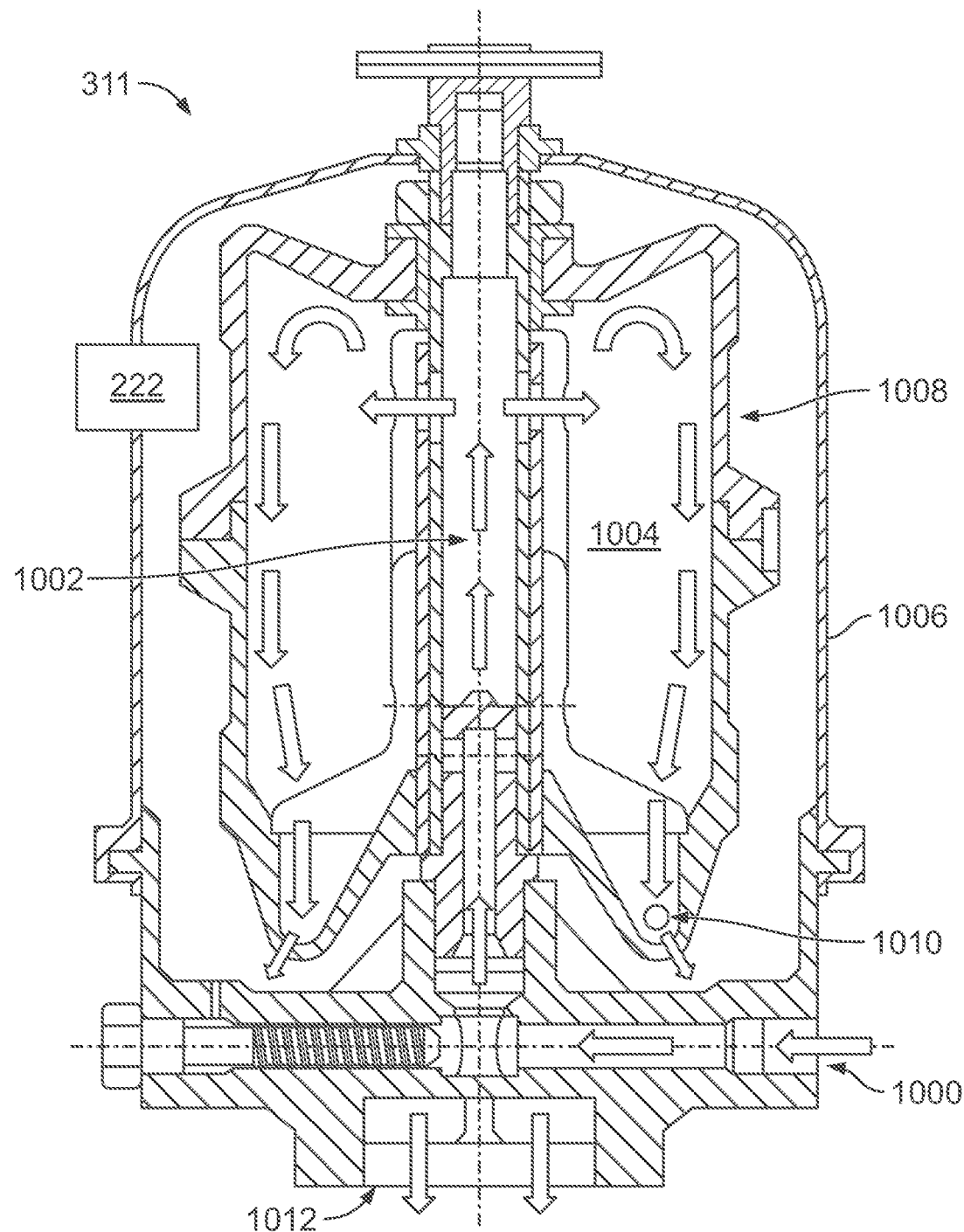
FIG. 10 illustrates a cross-sectional view of one embodiment of an oil filter.

FIG. 10 illustrates a cross-sectional view of one embodiment of an oil filter. The oil filter is a centrifugal oil filter having an inlet 1000 through which oil (e.g., dirty oil) is received into a center conduit 1002 in an interior chamber 1004 of the oil filter. An external cover 1006 at least partially encloses the interior chamber. A rotor 1008 spinning in the chamber draws the oil through the center conduit and out of the center conduit into the interior chamber. The oil is filtered and exits the interior chamber through nozzles 1010 and out of the oil filter through an outlet 1012.

The oil filter can include one or more of the sensor as a speed sensor disposed in or coupled with the external cover. This speed sensor can measure how rapidly the rotor 1008 spins in the interior chamber. For example, the speed sensor can be a Hall effect sensor, a reed switch sensor, an optical sensor, or the like, that measures the speed at which the rotor spins.

As described above, the operating point may be the rotor speed, or the speed at which the rotor rotates within the interior chamber. The monitoring system may detect the rotor speed via the sensor and record the amount of time elapsed until the first and second parameters stop. The changes of the first and second parameters may create a profile that can correlate the rotor speed behavior and may identify discrepancies and/or issues of the oil filter. For example, the differences between rotor speeds of the oil filters may represent a clean filter, issues with the filter, soot cake, mass building on the oil filters, and/or the like.

The monitoring system may identify a shift 608 in the parameters based on differences in the morphologies of the first and second parameters. Based on the change in morphology (e.g., represented as the shift), the monitoring system may calculate or estimate the cumulative damage or additional damage to the component. For example, larger shifts can be associated with greater amounts of increased damage, while smaller shifts are associated with lesser amounts of increased damage. Additionally or alternatively, the amount of the cumulative or additional damage may be determined by the monitoring system based on, at least in part, the rates of change in the parameter. For example, the acceleration may be represented as a slope of the first and second parameters. The controller circuit may calculate changes in the slope (e.g., acceleration) between the first and second parameter to determine the cumulative damage of the at least one component based on the shift. For example, the shift may represent the cumulative damage of the at least one component and/or an end of life date of the component based on the first and second parameters. Accordingly, even if the health status of the component is currently good, if the rate of degradation is above a determined threshold the monitoring system may signal a shopping event is needed. The monitoring system, in one embodiment, can determine if the degradation is happening in a linear fashion or if the damage is occurring in exponential fashion and can calculate an end of life data accordingly. An understanding of the operating conditions of the component that led to the high-stress event causing the accelerated damage may allow the monitoring system to suggest (or automatically control) the operation of the components in a way to slow or prevent further damage to the component.

Figure 7:
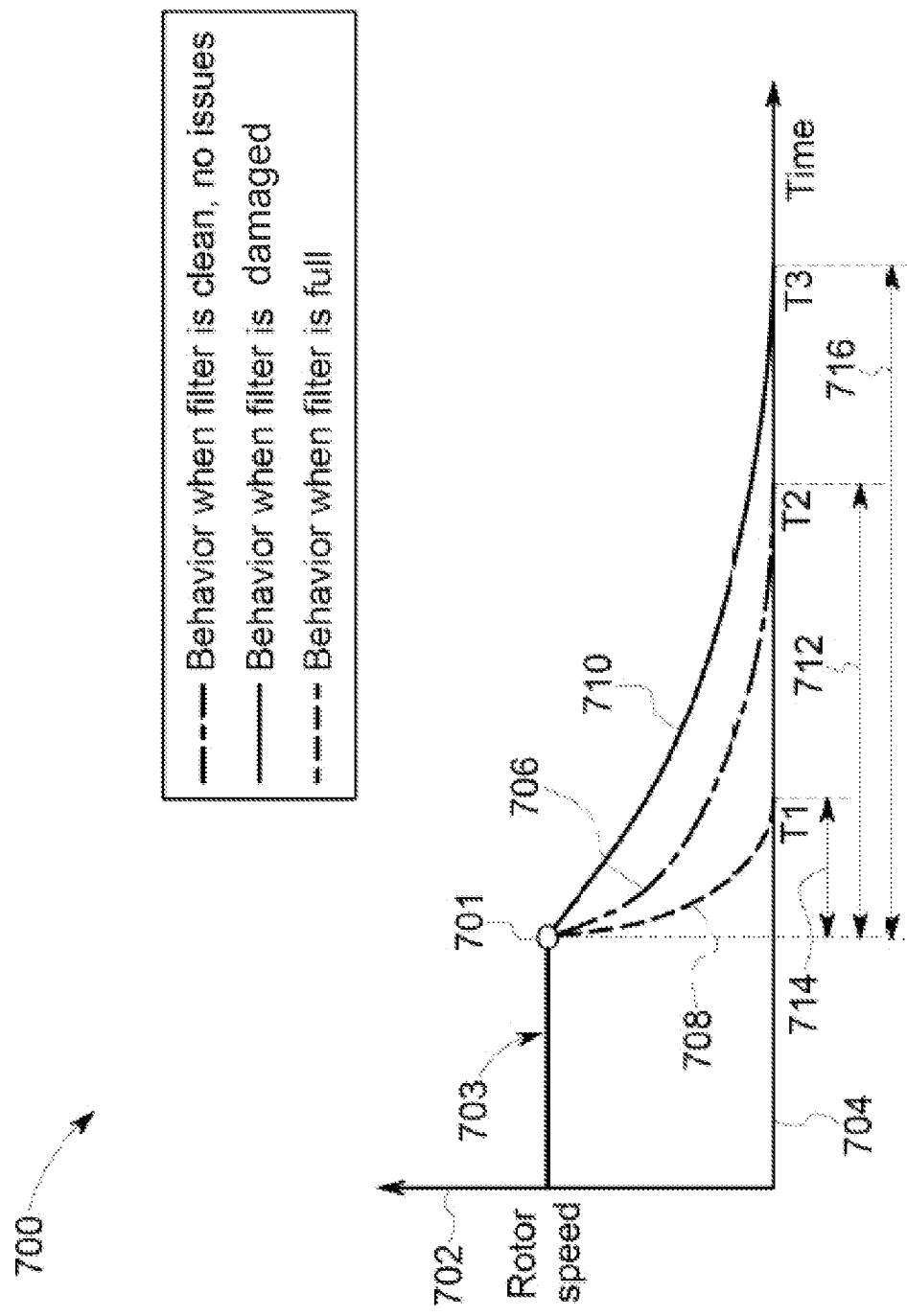
FIG. 7 is a graphical illustration of an embodiment of behavior of an oil filter.

FIG. 7 is a graphical illustration 700 of an embodiment of behavior of the oil filters. The graphical illustration shown along the vertical axis 702 that represents rotor speed, and a horizontal axis 704 that represents time. The graphical illustration includes three different profiles of the rotor speed (e.g., based on the one or more parameters from the one or more sensor).

Each profile 706, 708, 710 represents decay of the speed at which a rotor of a centrifuge oil filter spins following deactivation of an engine onboard the vehicle. The monitoring system can create the profiles based on sensor parameters that are measured over time. For example, during each of first, second, and third trips of the same vehicle having the same centrifuge oil filter, the rotor of the centrifuge oil filter can be rotating at a constant or substantially constant speed 703 (e.g., does not vary by more than 5%). Upon deactivating the engine, the speed of the rotor may begin to decrease. During a first trip, the rotor speed decreases from the speed at a deactivation time 701 to a stationary speed at a time $t_2$ within a first time period 712. The decrease in rotor speed with respect to time for this first trip is represented by the first profile 706. During a subsequent second trip, the rotor speed decreases from the speed 703 at the deactivation time 701 to a stationary speed at a time $t_1$ within a shorter second time period 714. The decrease in rotor speed with respect to time for this second trip is represented by the second profile 708. During a subsequent third trip, the rotor speed decreases from the speed 703 at the deactivation time 701 to a stationary speed at a time $t_3$ within an even longer third time period 716. The decrease in rotor speed with respect to time for this third trip is represented by the third profile 710.

The decrease in time needed for the rotor speed to decrease to zero may be due to a buildup of mass (e.g., soot cake) on the oil filters and/or debris accumulated on the filters. For example, the speed at which the rotor of the oil centrifuge filter rotates is monitored while the engine is operating. The coast down (e.g., slowing down) of this rotor is monitored after the engine is shut down (e.g., turned off). Shutting down the engine removes the oil pressure that drives rotation of the rotor of the oil filter. After characterizing the healthy centrifuge filter coast down that may be measured when the filter is not dirty or full of mass buildup (e.g., the first profile), deviations from that profile can indicate an unhealthy centrifuge filter (e.g., a filter that has more mass buildup). For example, filters with more mass buildup may coast down faster than filters with less mass buildup due to more friction being present in the filters with more mass buildup (e.g., the profile 708 and/or 710). The mass buildup on the oil filter may clog and/or prohibit flow of the oil and/or lubricant through the oil filters. This can cause the spinning of the rotor to slow down faster after deactivation (e.g., relative to less or no mass build up on the oil filters). In one example, the first profile 706 represents behavior of the rotor when the oil filter is new or clean and is operating properly. The second profile 708 can represent behavior of the rotor when the oil filter is full of debris or mass and is not able to properly filter oil. The third profile 710 can represent behavior of the rotor when the oil filter is not operating correctly due to other damage to the filter.

Damage to the oil filters may affect the ability of the oil filters to properly allow oil and/or lubricant to pass through the oil filters. Based on examination of the profiles 706, 708, 710, the monitoring system may instruct the display to present a diagnostic message to alert the need of servicing of the oil filters. For example, the monitoring system 200 displays a diagnostic message to alert for possible malfunctions and/or defects of the oil filter based on the profile 710. Additionally or alternatively, the monitoring system optionally may instruct the energy management system to adjust the trip plan based on detection of the profile 708 and/or 710. For example, the monitoring system may identify the profile 710 and determine that the oil filters are damaged. The monitoring system can then instruct the energy management system to adjust the trip plan based on the damage to the oil filters. For example, the energy management system may indicate a new and/or modified trip plan based on the instructions from the monitoring system. The modified and/or new trip plan may reduce the throttle, breaking, schedule, and/or the like, relative to the previous trip plan. Based on the new and/or modified trip plan, additional damage to the oil filters may be reduced relative to the damage that would have occurred with operating according to the previous trip plan. The new or adjusted trip plan may prolong and/or extend the end of life date of the filter for longer than the entire duration of the modified or new trip plan. For example, the modification of the modified and/or new trip plan may result in less wear or use of the component relative to the operation of the vehicle system according to the previous trip plan.

In one embodiment, the monitoring system may instruct the display to indicate that the oil filters may be damaged based on the profiles 708, 710. For example, the operator may be advised via the display by the monitoring system via a diagnostic message, a code (e.g., indicating a need to inspect the oil filters), or the like, to alert the operator of a required corrective action. Optionally, the monitoring system can direct the controller circuit to restrict the engine operation in case a critical issue is detected (e.g., the profile 710). In another example, responsive to identifying the profile 708, the monitoring system can automatically communicate with a scheduling system to schedule the maintenance or replacement of the oil filter.

At step 408, the monitoring system may determine a non-zero threshold for the at least one component. The non-zero threshold may be based on the cumulative usage with respect to the fraction of life consumed (e.g., the variable C) and/or the rainflow cycle count matrix shown in FIG. 5. Optionally, the non-zero threshold may be a magnitude, percentage, and/or the like prior to the fraction of life consumed of C approximately one (e.g., as shown in Equation 1). For example, the monitoring system can determine the end of life date of the component based on the non-zero threshold, with the end of life date being farther away (e.g., longer) for bigger differences between the cumulative damage and the threshold, and the end of life date being closer (e.g., shorter) for smaller differences between the cumulative damage and the threshold.

Additionally or alternatively, the non-zero threshold may be based on a trip plan that will be executed by the energy management system. For example, the monitoring system may analyze the trip plan based on the throttle assigned during the trip plan for the propulsion subsystem. Additionally or alternatively, the controller circuit may utilize the trip plan generated by the energy management system to predict an amount of cumulative usage for the at least one component. In connection with FIG. 7, the controller circuit may calculate a probability of damage 706 based on the throttle along the trip plan. Higher throttle settings can be associated with increased probabilities of damage, while lower throttle settings can be associated with reduced probabilities of damage. The threshold can be determined based on the probability of damage, with the threshold being smaller for greater probabilities of damage and larger for smaller probabilities of damage. The monitoring system can instruct the energy management system to adjust the throttle of the propulsion subsystem based on the cumulative damage. For example, the monitoring system can instruct the energy management system to reduce a throttle setting dictated by a trip plan by more for greater cumulative damage, and by lesser settings for lesser cumulative damage.

Figure 8:
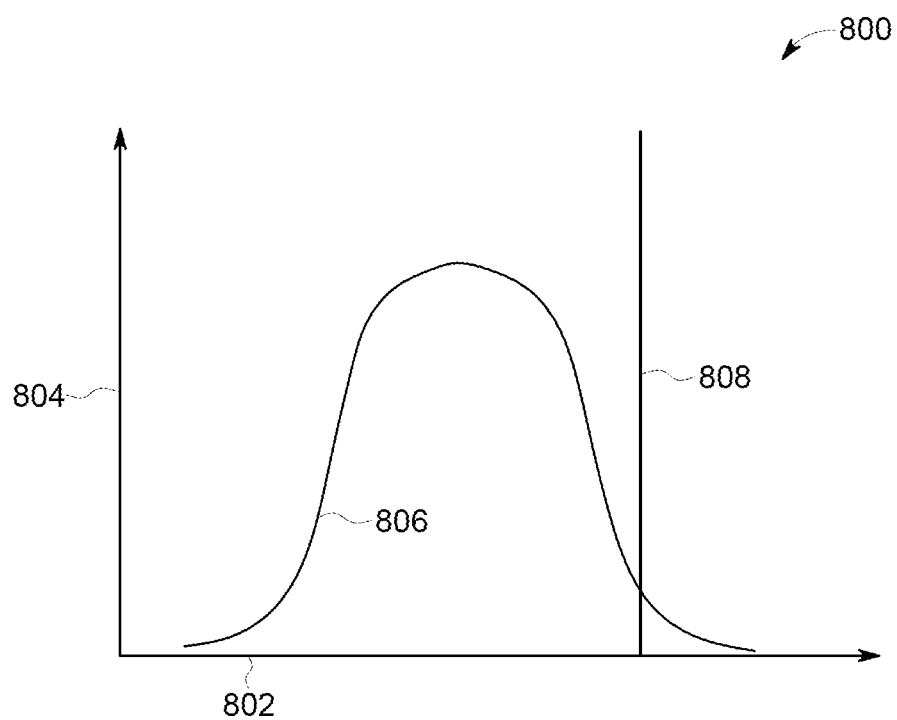
FIG. 8 is a graphical illustration of an embodiment of probability of damage of at least one component of a propulsion subsystem.

FIG. 8 is a graphical illustration 800 of an embodiment of the probability of damage 806 of the component of the propulsion subsystem. The probability of damage is shown along a horizontal axis 802 representing damage of the component, and a vertical axis 804 representing a probability of additional damage to the component. The amount of damage may be determined by the monitoring system based on the throttle and the mechanical specifications of the component stored in the memory (e.g., as described in operation step 404). The probability of damage may be based, at least in part, on operation of one or more trip plans. For example, trip plans that dictate settings placing a greater load on components of the propulsion system may be associated with increased probabilities of damage, while trip plans that dictate settings placing a lesser load on components of the propulsion system may be associated with decreased probabilities of damage.

The likelihood that the component will be damaged or fail during an upcoming trip can be determined by identifying a position along the horizontal axis and determining the probability of damage at that position. The position along the horizontal axis can be based on the usage duty cycle of the propulsion subsystem. For example, the turbocharger having many duty cycles involving transitioning between extreme throttle settings (e.g., from notch one to nine) may be positioned closer to the center of the horizontal axis (e.g., the location of the peak probability of damage), while a turbocharger having fewer duty cycles and/or smaller changes in throttle settings.

Additionally or alternatively, the controller circuit may set the non-zero threshold based on the morphology of the one or more parameters. For example, the controller circuit may set the non-zero threshold relative to a difference between the morphologies of the first and second parameters (FIG. 6). The non-zero threshold may be a percentage, magnitude, and/or the like difference between the morphologies of the first and second parameters. For example, the non-zero threshold may represent a shift magnitude, acceleration, and/or the like of the first and second parameters. Larger shifts between the parameters can be associated with smaller thresholds, while smaller shifts between the parameters can be associated with larger thresholds.

At step 410, the monitoring system can determine whether the end of life date is reached and/or whether maintenance or servicing of the component is needed. For example, the monitoring system may compare the cumulative damage of the component (e.g., the value of C) with the non-zero threshold to determine whether the end of life date is reached, or to determine that maintenance or service of the component is needed. The maintenance or servicing of the at least one component may represent cleaning, replacing, repairing, and/or the like of the at least one component during an overhaul even, scheduled maintenance, and/or the like.

Figure 9:
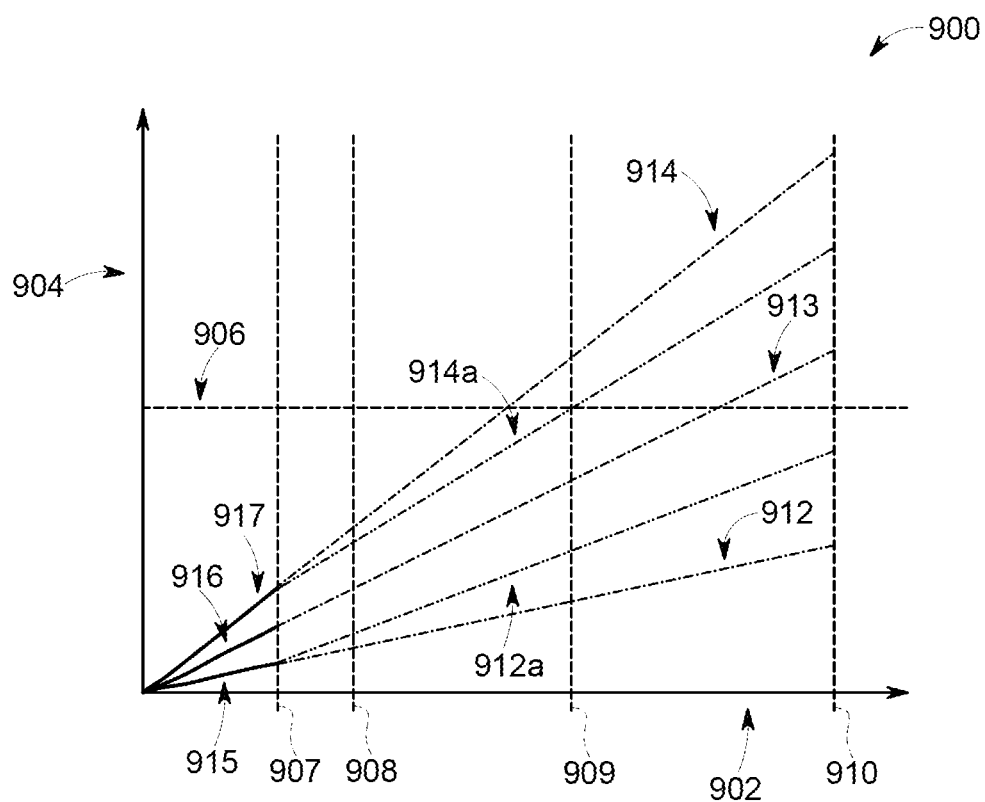
FIG. 9 is a graphical illustration of an embodiment of a probability of failure of at least one component of a propulsion subsystem exceeding a threshold limit of failure.

FIG. 9 is a graphical illustration 900 of different probabilities of failure 912, 913, 914 of a component of the propulsion subsystem, as determined by the monitoring system. The probabilities of failure can be calculated by the monitoring system over multiple trips based, at least in part, on predicted cumulative damage of the component. The probabilities of failure increase with respect to time as the component continues to be used, starting at an initial time.

A non-zero threshold 906 indicates a threshold limit of failure. The threshold 906 may represent a point when the probabilities of failure indicate that the component has reached the end of life date of the component. For example, the component may reach the end of life date responsive to the probability of failures crossing the threshold.

The probabilities of failure are shown along a horizontal axis 902 representing time and/or operation time, and a vertical axis 904 that represents increased likelihoods of component failure (e.g., upward along the vertical axis). The times at which different overhaul or servicing events 908, 909, 910 occur are shown along the horizontal axis. The overhaul events represent determined periods when the vehicle reaches a scheduled maintenance cycle. During the overhaul events, the component may be repaired or replaced. In one embodiment, the overhaul determinations are done in advance, or are pre-determined. Of note, pricing and warranty associated with contractual elements of the equipment may be predicated, at least in part, on the overhaul determinations.

Based on the different probabilities of failure, the monitoring system may adjust an operation of the vehicles. For example, the monitoring system may instruct the energy management system to adjust the trip plan to allow the components to reach an overhaul event prior to the end of life date and/or the probability of failure exceeding the threshold. During operation of the vehicle system, the monitoring system may instruct the controller circuit to reduce a tractive effort to the reduce the probability of failure 914 to 914a. As another example, during operation of another vehicle system, the monitoring system may instruct the controller circuit to increase a tractive effort, which can increase the probability of failure 912 to 912a.

Additionally or alternatively, the controller circuit may calculate a probability of cumulative damage to the component of the propulsion subsystem. For example, the probability of the cumulative damage is calculated by the controller circuit over multiple successive trip plans, time of operation (e.g., days, months, years, and/or the like), and/or the like. The probability of cumulative damage may represent different trajectories of the component of different propulsion-generating vehicles of the vehicle system. For example, the probability of damage may be calculated by the controller circuit from a current time (e.g., similar to the time indicated by reference number 907) having calculated cumulative damages based on previous usage duty cycle (e.g., similar to and/or the same as the cumulative damages 915-917). The controller circuit may calculate the probability of the cumulative damage based on the cumulative damage and the current time. The controller circuit may compare the trajectories of the probability of cumulative damage to a threshold. The threshold may represent an end of life date and/or probability of failure of the component. For example, when the probability of cumulative damage of the component crosses the threshold the component may have a high probability of reaching the end of life date. Based at least in part on the probability of cumulative damage, similar to the adjustments described in connection with FIG. 9 above, the controller circuit may adjust operation of the vehicles, such as over one or more trip plans to allow the components to reach maintenance and/or overhaul evens prior to end of life date and/or portability of failure.

The monitoring system may instruct the energy management system to adjust the trip plans of the vehicle system based on the trajectory of the probability of damage to the component. For example, if the component is associated with the probability of damage 914, the monitoring system can request that the energy management system reduce throttle settings, increase brake settings, or the like, to reduce the probability of damage 914 to 914a.

Additionally or alternatively, the controller circuit may verify the end of life date of the component with a characteristics parameter. For example, the controller circuit may be operably coupled to a second sensor attached to the component. The second sensor may generate the characteristics parameter. The characteristics parameter may be indicative of oscillation and/or vibration of the component within the propulsion subsystem during operation of the vehicle. For example, the second sensor may be an accelerometer mechanically fastened to the oil filter. During operation of the propulsion subsystem, soot and/or debris within the oil filter may cause the oil filter to vibrate and/or oscillate. When the controller circuit determines at step 410 that the component has reached the end of life date, the controller circuit may verify that oscillation and/or vibrations are present in the characteristics parameter.

If the end of life date of the component is reached, then at step 412, the monitoring system and/or the controller circuit may generate an alert. The alert may be a visual and/or auditory alert that may alert the operator of the vehicle system. For example, the controller circuit may generate a graphical icon, a pop-up window, an animated icon, and/or the like shown on the display 206. In another example, the controller circuit may generate an auditory alert. It may be noted that the alert may be managed by the remote system off-line and/or remote from the vehicle system. For example, the remote system may transmit an instruction that is received by the controller circuit via the bi-directional communication link via the communication circuit to generate the alert.

At step 414, the monitoring system and/or the controller circuit may implement one or more responsive actions. It may be noted that the one or more responsive actions may be managed by the remote system off-line and/or remote from the vehicle system. The one or more responsive actions may be executed by the controller circuit concurrently with and/or automatically when the alert is generated at step 412. The responsive actions can include automatically scheduling maintenance or replacement of the component, changing a trip plan of the vehicle that includes the component (as described herein), and/or restricting operation of the vehicle. For example, the controller circuit may apply one or more limits on the speeds, throttle settings, or the like, to prevent further damage or failure of the component.

In one embodiment, a system includes a sensor that may detect a parameter of a propulsion subsystem of a vehicle, and one or more controllers that may generate a first trip plan and to automatically control the vehicle according to the first trip plan. At least one of the controllers is operatively connected to the sensor and may receive the parameter of the propulsion subsystem, to calculate a cumulative damage of a component of the propulsion subsystem based on the parameter, and to determine an end of life date of the component relative to the cumulative damage. At least one of the one or more controllers may generate a new trip plan or modify the first trip plan into a modified trip plan based on at least one of the cumulative damage or the end of life date, where the new trip plan or the modified trip plan may plan or modify a plan during operation of the vehicle for at least one of an adjustment in velocity or to avoid one or more operating conditions of the vehicle, relative to the original or first trip plan. This may lower wear or use of the component relative to operation of the vehicle according to the first trip plan. Optionally, the propulsion subsystem includes an oil filter, and the one or more controllers that may identify an amount of time between a shutdown to reduce oil from passing through oil filter. The one or more controllers that may use the amount of time to determine at least one of a clean oil filter, a mass on the oil filter, or damage to the oil filter. Optionally, the one or more controllers may display a diagnostic message to alert for possible damage to the oil filter based on the amount of time, and the one or more controllers may adjust at least one of a throttle of the vehicle or control settings of the first trip plan that applied to the vehicle during travel along a trip plan based on the damage to the oil filter. Optionally, the one or more controllers may adjust one or more throttle settings that are designated in the first trip plan for controlling the vehicle during a trip plan, based on the cumulative damage of the component.

The one or more controllers may adjust the one or more throttle settings or a schedule of the vehicle based on the component repair cost of the component. The one or more controllers may determine a usage duty cycle of the propulsion subsystem, and to determine the cumulative damage based on the usage duty cycle. The one or more controllers that may determine the end of life date based on a non-zero threshold. The one or more controllers that may adjust a tractive effort of the propulsion subsystem based on the cumulative damage. The one or more controllers may calculate a rainflow cycle count matrix to determine a level of fatigue or stress exhibited by the propulsion subsystem based on a throttle of the vehicle, and the one or more controllers that may determine the cumulative damage based on the rainflow cycle count matrix.

The one or more controllers may determine a non-zero threshold based on a rainflow cycle count matrix, and the one or more controllers that may determine the end of life date based on the non-zero threshold. The one or more controllers may adjust at least one of a throttle, a brake, or a schedule of a trip plan of the propulsion subsystem to reduce damage of the component of the cumulative damage. The one or more controllers may determine the end of life date based on a morphology of the parameter and another parameter that is detected by the sensor or another sensor. The sensor may acquire at least one of a rotor speed, a pressure, or a temperature of the propulsion subsystem as the parameter. The one or more controllers may determine the cumulative damage trip plan based on a projected life of a component of the propulsion subsystem, the one or more controllers can set a non-zero threshold based on the projected life of the component, where the projected life represents an amount of operable life of the component prior to the end of life date. The one or more controllers may calculate predicted cumulative damages of the component of the propulsion subsystem based on successive trip plans of the vehicle, and the one or more controllers that may determine different failure or usage trajectories of the component to identify the end of life date of the component based on the failure or usage trajectories to determine the end of life date. A failure or usage trajectory can represent how the likelihood of failure or the amount of remaining useful life is predicted or expected to change in the future. For example, plans for increased usage of a component in harsher conditions (e.g., higher throttle settings, increased temperatures, increased humidity, longer duty cycles, etc.) can result in the controller(s) calculating increased likelihoods of failures or more rapidly decreasing remaining useful lives for the component relative to plans for decreased usage of the component in less harsh conditions (e.g., lower throttle settings, reduced temperatures, reduced humidity, shorter duty cycles, etc.). The one or more controllers may generate an alert on a display when the end of life date is reached. The alert may be at least one of a visual or an audible alert, and the alert automatically schedules maintenance for the component.

In one embodiment, a method includes receiving from one or more sensors parameters measured from a propulsion subsystem of the vehicle, calculating a cumulative damage of a component of the propulsion subsystem based on the parameters, generating a first trip plan (where the first trip plan includes control settings to automatically control the vehicle during a trip plan), determining an end of life date of the component relative to the cumulative damage, and generating a new trip plan for controlling the vehicle during the trip plan or modifying the first trip plan into a modified trip plan, responsive to and based on at least one of the cumulative damage or the end of life date. The propulsion subsystem may include an oil filter, and the method also includes further comprising identifying an amount of time between a shutdown to reduce oil from passing through oil filter. The amount of time can be used to determine at least one of a clean oil filter, a mass on the oil filter, or damage to the oil filter. Optionally, the method may include adjusting one or more throttle settings that are designated in the first trip plan for controlling the vehicle during a trip plan, based on the cumulative damage of the component. The method may include calculating a predicted cumulative damage of the component of the propulsion subsystem based on successive trip plans of the vehicle and determining different trajectories of the component to identify an end of life date of the component based on a probability of failure representing the end of life date. The projected life can represent an amount of operable life of the component prior to the end of life date.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

Components of the systems described herein may include or represent hardware circuits or circuitry that include and/or are connected with one or more processors, such as one or more computer microprocessors. The operations of the methods described herein and the systems can be sufficiently complex such that the operations cannot be mentally performed by an average human being or a person of ordinary skill in the art within a commercially reasonable time period. For example, the generation and/or analysis of the speed signatures may take into account a large amount of factors, may rely on relatively complex computations, and the like, such that such a person cannot complete the analysis of the speed signatures within a commercially reasonable time period.

As used herein, the term "computer," "subsystem," "circuit," "controller circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term computer," "subsystem," "circuit," "controller circuit," or "module". The "computer," "subsystem," "circuit," "controller circuit," or "module" executes a set of instructions that are stored in one or more storage elements, to process input data. The storage elements may also store data or other information as desired or needed. The storage element may be in the form of an information source or a physical memory element within a processing machine. The set of instructions may include various commands that instruct the computer," "subsystem," "circuit," "controller circuit," or "module" to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine. To the extent that the figures used herein illustrate diagrams of the functional blocks of various embodiments, the functional blocks are not necessarily indicative of the division between hardware circuitry. Thus, for example, one or more of the functional blocks (for example, processors or memories) may be implemented in a single or multiple pieces of hardware (for example, electronic circuits and/or circuitry that include and/or are connected with one or more processors, microcontrollers, random access memories, hard disks, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

What is claimed is:

1. A system comprising:

a sensor configured to measure one or more parameters of operation of one or more propulsion systems of a vehicle system; and a controller configured to identify one or more high-stress events of the one or more propulsion systems based on the one or more parameters that are measured, the controller being configured to calculate or obtain a cumulative usage of a component of the one or more propulsion systems based at least in part on the one or more high-stress events that are identified, and to determine a health status, predict an end of life date, or both of the component of the one or more propulsion systems based at least in part on the cumulative usage that is calculated, wherein the high-stress event is associated with one or more of:

an operating speed, a temperature, or a throttle setting of the propulsion system;

a supplied voltage, a supplied current, a current balance, or an internal resistance of a battery system of the vehicle system; or operation of a cooling fan of the vehicle system, or an ambient atmosphere surrounding the vehicle system for cooling.

2. The system of claim 1, wherein the controller is configured to generate a trip plan, and optionally to change one or more operational settings during a trip, for the vehicle system based at least in part on the health status of the component.

3. The system of claim 1, wherein the controller is configured to automatically schedule repair, maintenance, or inspection of the component based on one or both of the health status that is determined and the end of life date that is predicted.

4. The system of claim 1, wherein the vehicle system includes plural vehicles, and the controller is configured to change a distribution of loads among the vehicles based on the end of life date that is predicted.

5. The system of claim 1, wherein the component is an oil filter, and the controller is configured to shut down a first propulsion system of the one or more propulsion systems and the sensor is configured to measure a rotating speed of the oil filter.

6. The system of claim 5, wherein the controller is configured to determine an amount of time before the rotating speed of the oil filter slows to a designated speed following shut down of the first propulsion system as the one or more parameters.

7. The system of claim 6, wherein the controller is configured to select the cumulative usage of the oil filter from several different potential cumulative usages each associated with a different value of the amount of time before the rotating speed of the oil filter slows to the designated speed.

8. The system of claim 1, wherein the controller is configured to identify the one or more high-stress events responsive to one or more of the operating speed of the one or more propulsion systems exceeding a speed threshold, the temperature of the one or more propulsion systems exceeding a temperature threshold, or the throttle setting of the one or more propulsion systems exceeding a setting threshold.

9. A method comprising:
measuring one or more parameters of operation of one or more propulsion systems of a vehicle system;
identifying one or more high-stress events of the one or more propulsion systems based on the one or more parameters that are measured;
calculating a cumulative usage of a component of the one or more propulsion systems based on the one or more high-stress events that are identified; and
predicting an end of life date of the component of the one or more propulsion systems based on the cumulative usage that is calculated,
wherein the high-stress event is associated with one or more of:
an operating speed, a temperature, or a throttle setting of the propulsion system;
a supplied voltage, a supplied current, a current balance, or an internal resistance of a battery system of the vehicle system; or
operation of a cooling fan of the vehicle system, or an ambient atmosphere surrounding the vehicle system for cooling.

10. The method of claim 9, further comprising:
automatically changing one or more planned operational settings for a current trip or upcoming trip of the vehicle system based on the end of life date that is predicted.

11. The method of claim 9, further comprising:
automatically scheduling repair, maintenance, or inspection of the component based on the end of life date that is predicted.

12. The method of claim 9, wherein the vehicle system includes plural vehicles, and further comprising:
changing a distribution of loads among the vehicles based on the end of life date that is predicted.

13. The method of claim 9, wherein the component is an oil filter, and further comprising:
shutting down a first propulsion system of the one or more propulsion systems; and
measuring a rotating speed of the oil filter following the first propulsion system being shut down.

14. The method of claim 13, further comprising:
tracking an amount of time before the rotating speed of the oil filter slows to a designated speed following shut down of the first propulsion system as the one or more parameters.

15. The method of claim 14, further comprising:
selecting the cumulative usage of the oil filter from several different potential cumulative usages each associated with a different value of the amount of time before the rotating speed of the oil filter slows to the designated speed.

16. The method of claim 9, wherein the one or more high-stress events are identified responsive to one or more of the operating speed of the one or more propulsion systems exceeding a speed threshold, the temperature of the one or more propulsion systems exceeding a temperature threshold, or the throttle setting of the one or more propulsion systems exceeding a setting threshold.

17. A system comprising:
a controller configured to identify one or more high-stress events of a propulsion system of a vehicle system based on one or more parameters that are measured by a sensor, the controller configured to calculate a cumulative usage of the propulsion system based on the one or more high-stress events that are identified, and the controller is configured to predict an end of life date of a component of the propulsion system based on the cumulative usage that is calculated and to automatically change one or more planned operational settings for a current trip or upcoming trip of the vehicle system based on the end of life date that is predicted,
wherein the high-stress event is associated with one or more of:
an operating speed, a temperature, or a throttle setting of the propulsion system;
a supplied voltage, a supplied current, a current balance, or an internal resistance of a battery system of the vehicle system; or
operation of a cooling fan of the vehicle system, or an ambient atmosphere surrounding the vehicle system for cooling.

18. The system of claim 17, wherein the vehicle system includes plural vehicles, and the controller is configured to change a distribution of loads among the vehicles based on the end of life date that is predicted.

19. The system of claim 17, wherein the component is an oil filter, the controller is configured to shut down the propulsion system of the one or more propulsion systems and monitor a rotating speed of the oil filter following shut down of the propulsion system, the controller configured to determine an amount of time before the rotating speed of the oil filter slows to a designated speed following shut down of the propulsion system as the one or more parameters.

20. The system of claim 17, wherein the controller is configured to identify the one or more high-stress events responsive to one or more of the operating speed of the one or more propulsion systems exceeding a speed threshold, the temperature of the one or more propulsion systems exceeding a temperature threshold, or the throttle setting of the one or more propulsion systems exceeding a setting threshold.

* * * * *